US012188257B2

(12) United States Patent
Nicoara et al.

(10) Patent No.: US 12,188,257 B2
(45) **Date of Patent: *Jan. 7, 2025**

(54) BARREL PIN ASSEMBLIES

(71) Applicant: RAV BARIACH (08) INDUSTRIES LTD., Ashkelon (IL)

(72) Inventors: Peter Nicoara, Ashdod (IL); Eran Goldstein, Givatayim (IL)

(73) Assignee: Rav Bariach (08) Industries Ltd., Ashkelon (IL)

( * ) Notice: Subject to any disclaimer, the term of this patent is extended or adjusted under 35 U.S.C. 154(b) by 1080 days.

This patent is subject to a terminal disclaimer.

(21) Appl. No.: 16/699,000

(22) Filed: Nov. 28, 2019

(65) Prior Publication Data

US 2020/0173192 A1 Jun. 4, 2020

Related U.S. Application Data

(60) Provisional application No. 62/772,850, filed on Nov. 29, 2018.

(51) Int. Cl.

| | |
|---|---|
| ***E05B 27/00*** | (2006.01) |
| ***E05B 19/00*** | (2006.01) |
| ***E05B 27/10*** | (2006.01) |

(52) U.S. Cl.

CPC ...... *E05B 27/0003* (2013.01); *E05B 19/0058* (2013.01); *E05B 27/0021* (2013.01); *E05B 27/0078* (2013.01); *E05B 27/10* (2021.08)

(58) Field of Classification Search

CPC ...... E05B 27/00; E05B 27/0003; E05B 27/10; E05B 19/0058; E05B 27/0021; E05N 27/0078

USPC ........................................................... 70/361

See application file for complete search history.

(56) References Cited

U.S. PATENT DOCUMENTS

| | | | | | |
|---|---|---|---|---|---|
| 5,123,268 | A * | 6/1992 | Eizen | E05B 27/0021 | 70/359 |
| 5,894,750 | A * | 4/1999 | Liaw | E05B 27/0021 | 70/378 |
| 7,448,239 | B1 * | 11/2008 | Huang | E05B 27/005 | 70/495 |
| 2005/0204788 | A1 * | 9/2005 | Almoznino | E05B 27/006 | 70/419 |
| 2008/0236224 | A1 * | 10/2008 | Chong | E05B 29/0066 | 70/358 |

FOREIGN PATENT DOCUMENTS

| | | | | |
|---|---|---|---|---|
| AU | 2003255210 A1 * | 5/2004 | | |
| EP | 625624 A1 * | 11/1994 | ......... | E05B 27/0007 |
| EP | 3103943 A1 * | 12/2016 | | |
| JP | 2016513765 A * | 5/2016 | | |

* cited by examiner

*Primary Examiner* — Suzanne L Barrett

(74) *Attorney, Agent, or Firm* — The IP Law Firm of Guy Levi, LLC

(57) ABSTRACT

The disclosure relates to a cylinder lock wherein an eccentric barrel pin assembly with two contact points within the keyway are independently movable within the barrel to a common shear line against a single nested column pin assembly.

17 Claims, 7 Drawing Sheets

BARREL PIN ASSEMBLIES

This patent application is a U.S. National Phase filing of commonly owned and PCT Application No. PCT/IL2019/051305, filed Jan. 24, 2020, claiming priority from U.S. Provisional Patent Application No. 62/772,850, filed Nov. 29, 2018, both which are incorporated herein by reference in their entirety.

BACKGROUND

Background

The disclosure is directed in general to an improved cylinder lock. More specifically, the disclosure is directed to a cylinder lock, wherein an eccentric barrel pin assembly with two contact points within the keyway are independently movable within the barrel to a common shear line against a single nested column pin assembly.

Cylinder locks typically include a cylinder casing and a barrel rotatable in the casing. A plurality of barrel pins typically sit in the barrel and a plurality of pins are spring biased in registration therewith in the cylinder casing. When an appropriate key is inserted in the lock, the barrel pins are urged into height alignment inside the barrel and the casing pins are urged against the springs into a column portion extending radially from the casing, such that the shear line is not blocked (by any pin(s)) and the barrel can be turned inside the cylinder casing to lock or unlock the lock.

Locks to an entry must, in addition to allowing authorized individuals to enter, have specific key profiles that prevent unauthorized key duplication, either by an unauthorized entrant or an unauthorized professional assembling the duplicate key. Additionally, a variety of top-secret institutions require keys with more combinations that are difficult to duplicate in order to avoid unauthorized entry.

Present day flat blade keys often have depressions of different depths in the key blade or, in the cases of high-security entry, have holes that are of different shapes. Additionally, there are keys having a variety of shapes, such as round cross-sectioned keys; and keys having outward projecting bits; all for the purpose of preventing unauthorized entry and/or unauthorized key duplication.

The disclosure provided herein addresses these issues.

SUMMARY

In an embodiment, provided herein is a cylinder lock, comprising: a barrel having an axial keyway and a plurality of barrel bores extending radially from, and in communication with, the keyway, the barrel being selectably, rotatably movable within a cylindrical housing; the cylindrical housing having a column with a plurality of column bores extending radially from said barrel comprising a barrel pin assembly slidably movable within the barrel bore, wherein the barrel pin assembly comprising at least two, non-concentric engaging proximal ends, configured, when engaged by a key having at least two engagement sites, to slidably and independently translate along the barrel bore's longitudinal axis to a shear line against a single nested column pin assembly located in a corresponding column bore; a stopper disposed at the distal end of each column bore; and a biaser disposed within each column bore, sized and configured to bias the nested column pin assembly towards the barrel.

In another embodiment, the nested column pin assembly comprises an axially interrupted cylindrical housing defining a longitudinal axis and having a closed distal end and an open proximal end, the closed distal end defining a concentric aperture, wherein the axially interrupted cylindrical housing is sized and configured to accommodate an axially movable piston; the piston having a head portion with a flat proximal end and a stem extending distally from the head portion, the stem sized and configured to extend distally beyond the aperture defined in the axially interrupted cylindrical housing of the nested column pin assembly; and a spring sized to sheath the stem disposed distally to the head portion of the piston between the head portion and the axially interrupted cylindrical housing, configured to bias the piston away from the axially interrupted cylindrical housing.

In yet another embodiment, the nested column pin assembly comprises: an axially interrupted cylindrical housing defining a longitudinal axis and having a closed distal end and an open proximal end, the closed distal end defining a concentric aperture, wherein the axially interrupted cylindrical housing is sized and configured to accommodate a flanged upper piston and a cylindrical sleeve member; the flanged upper piston having a proximal flange with a flat proximal end and a flanged upper piston stem extending distally from the flange, the flanged upper piston stem sized and configured to extend distally beyond the aperture defined in the axially interrupted cylindrical housing of the nested column pin assembly; an upper spring sized to sheath the flanged upper piston stem disposed distally to the flange of the upper piston between the flange and the axially interrupted cylindrical housing, configured to bias the flanged upper piston away from the axially interrupted cylindrical housing; the cylindrical sleeve member disposed within the axially interrupted cylindrical housing, having an open distal end abutting the proximal end of the flange of the flanged upper piston, and an open proximal end, wherein the proximal end of the cylindrical sleeve further defines an internal rim, sized and configured to accommodate a portion of a nested column pin; the nested column pin, having a distal flange with a flat distal flange end, and a rod portion with a proximal end; and a nested spring disposed between the distal flange end of the nested column pin and the flat proximal end of the flanged upper piston.

BRIEF DESCRIPTION OF THE DRAWINGS

For a better understanding of the eccentric barrel pin assemblies with two contact points within the keyway described herein and their use in a cylinder lock, with regard to the embodiments thereof, reference is made to the accompanying drawings, in which like numerals designate corresponding elements or sections throughout and in which.

DETAILED DESCRIPTION

Figure 1A:
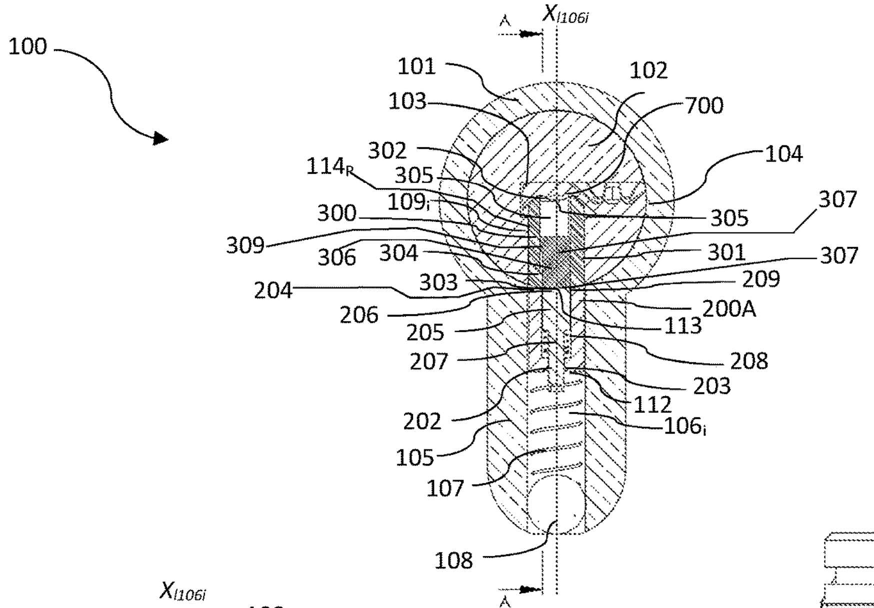
FIG. 1A, shows a X-Z cross section of a cylinder lock comprising an embodiment of the eccentric barrel pin assembly with two contact points within the keyway, a Y-Z cross section thereof illustrated in FIG. 1B and a X-Y barrel and key cut away of thereof illustrated in FIG. 1C.

Provided herein are embodiments of a cylinder lock wherein an eccentric barrel pin assembly with two contact points within the keyway is movable within the barrel to a common shear line against a single nested column pin assembly.

The term "coupled", including its various forms such as "operably coupling", "coupling" or "couplable", refers to and comprises any direct or indirect, structural coupling, connection or attachment, or adaptation or capability for such a direct or indirect structural or operational coupling, connection or attachment, including integrally formed components and components which are coupled via or through another component or by the forming process. Indirect coupling may involve coupling through an intermediary member or adhesive, or abutting and otherwise resting against, whether frictionally or by separate means without any physical connection.

In addition, the term "slidably" or "slidably coupled" refers to movement of one surface (for example the latching assembly) over a second surface (for example, the housing) while maintaining smooth continuous contact between the two surfaces. In another embodiment, the term "slidably coupled" means a state in which two or more components are coupled to one another such that at least one of the components (e.g., the nested column pin assembly) at least slides with respect to another component (e.g., column bores). Likewise; the terms "slide." "slid" or "sliding" are defined as moving, gliding or passing along or through a surface, although continuous contact at each point along the path is not necessarily required.

The term "engage" and various forms thereof, when used, refer to the application of any forces that tend to hold the engaged components together against inadvertent or undesired separating forces (e.g., such as may be introduced during use of the lock). It is to be understood, however, that engagement does not in all cases require an interlocking connection that is maintained against every conceivable type or magnitude of separating force.

The term "abut", or "abuts" should not be understood to strictly mean that the respective parts must be touching. Rather, "abuts" means that any remaining space between an abutting portion will not cancel or nullify the intended operation of the abutting components.

A more complete understanding of the components, and devices disclosed herein can be obtained by reference to the accompanying drawings. These figures (also referred to herein as "FIG.") are merely schematic representations based on convenience and the case of demonstrating the present disclosure, and are, therefore, not intended to indicate relative size and dimensions of the devices or components thereof, their relative size relationship and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function. Likewise, cross sections are referred to on normal orthogonal coordinate system having XYZ axis, such that Y axis refers to front-to-back, X axis refers to side-to-side, and Z axis refers to up-and-down.

Figure 1B:
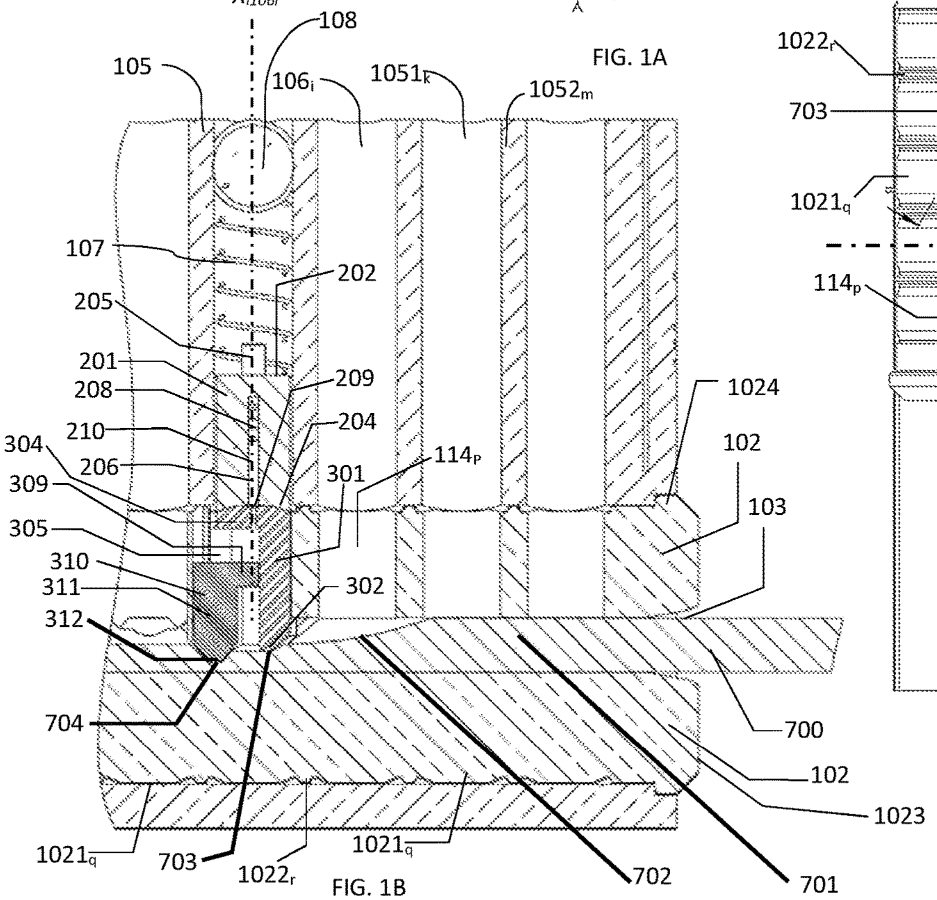
Figure 1C:
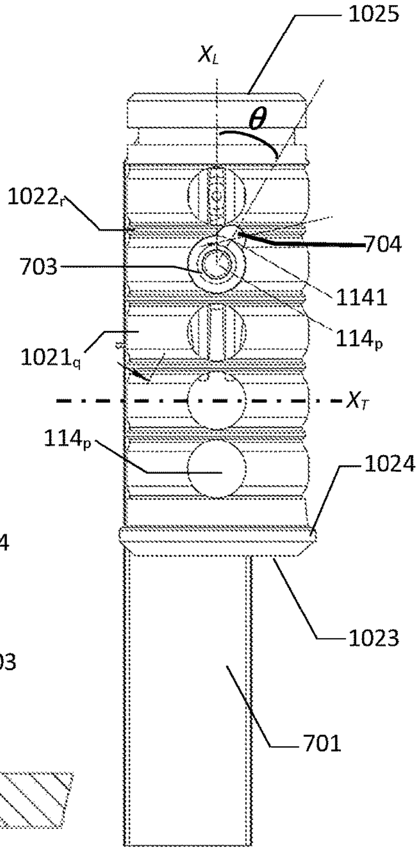

Turning now to FIGS. 1A-1C, illustrating an embodiment of cylinder lock 100, comprising barrel 102 having axial keyway 103 and a plurality of barrel bores $\mathbf{114}_P$ extending radially from—, and in communication with, axial keyway 103. As shown in FIG. 1A barrel 102 is being selectably rotatably movable within cylindrical housing 101. Cylindrical housing 101 has column 105 with a plurality (in other words, two and/or more) column bores $\mathbf{106}_i$ extending radially from (rotatable) barrel 102, and being in communication with barrel 102. As shown in FIG. 1B, barrel pin assembly 300A can be slidably movable within barrel bore $\mathbf{114}_P$, which comprises at least two, non-concentric engaging proximal ends 302, 312, configured, when engaged by key 700 (see e.g., FIG. 1C) having at least two engagement sites 703, 704, to slidably translate along barrel bore's $\mathbf{114}_P$ longitudinal axis $X_{l106i}$ (the same longitudinal axis defined by column bores $\mathbf{106}_i$), to shear line 10 against single nested column pin assembly 200A located in $i^{th}$ corresponding column bore $\mathbf{106}_i$. FIG. 1B also illustrates stopper 108 disposed at the distal end of each column bore $\mathbf{106}_i$ and first biaser 107 disposed within each column bore $\mathbf{106}_i$, sized and configured to bias nested column pin assembly 200A towards barrel 102.

As illustrated in FIG. 1C, barrel 102 having distal end 1025 and a flanged 1024 proximal end 1023 with radial slit 104, can be define longitudinal axis Xl and be divided into segments $\mathbf{1021}_q$ having curved outer surface, the segments separated by rings $\mathbf{1022}_r$. Similarly, as illustrated in FIG. 1B, column 105 of cylindrical housing 101 can comprise segments $\mathbf{1051}_k$ separated by ribs 1052*m*, such that the proximal end of columns' ribs 1052*m* are configured to abut barrel 102 rings $\mathbf{1022}_r$ which together with the curved outer surface of segments $\mathbf{1021}_q$, reduce friction between barrel 102 and cylindrical housing 101, thus leading to an easier operation of cylindrical lock 100.

In an embodiment, nested column pin assembly 200A comprises: axially interrupted cylindrical housing 201 (see e.g., FIGS. 2A-2D, referring to a cylinder with an incomplete wall spanning the height of the cylinder along its longitudinal axis) defining longitudinal axis and having closed distal end 202 and open proximal end 204, closed distal end 202 defining concentric aperture 203, wherein axially interrupted cylindrical housing 201 is sized and configured to accommodate axially movable piston 205. Piston 205 (in other words, the nested component) having head portion 206 with flat proximal end 209 and stem 207 extending distally from head portion 206. As illustrated, stem 207 is sized and configured to extend distally beyond aperture 203 defined in axially interrupted cylindrical housing 201 of nested column pin assembly 200A. Nested column pin assembly 200A further comprising spring 208 sized to sheath (in other words, surround as a sleeve) stem 207 disposed distally to head portion 206 of piston 205 between head portion 206 and the underside of axially interrupted cylindrical housing 201, spring 208 configured to bias piston 205 away from axially interrupted cylindrical housing 201 within tube 211 (see e.g., FIG. 2A) formed by axially interrupted cylindrical housing 201.

Turning now to FIGS. 1A-4B, illustrating embodiments of cylinder lock 100, key 700, nested column pin assembly 200A and the barrel pin assembly 300A. As illustrated for example, in FIG. 2C, barrel pin assembly 300A comprises: axially interrupted cylindrical housing 301 defining longitudinal axis $X_L$ and having proximal 302 end and open distal end 303, axially interrupted cylindrical housing 301 further defining shelf 304 disposed distally to opening 305 in axially interrupted cylindrical housing 301, wherein proximal end 302 of axially interrupted cylindrical housing 301 is sized, shaped and configured to be engaged in primary engagement site 703 (Sec e.g., FIG. 4A) on key 700 key blade 701. FIG. 2C also shows shuttle member 306, slidably coupled to axially interrupted cylindrical housing 301. For example, shuttle member 306 can comprise concentric member 307 having distal end 318 and proximal end 3181 and non-concentric member 310 extending radially and proximally (or downwards) from concentric member's 306 proximal end 3181, with non-concentric member 310 having pin 311 distal end 308 and proximal end 312 shaped, sized and configured to be engaged in secondary engagement site 704 on the key 700 key-blade 701, wherein non-concentric member 310 extends radially from concentric member 307 at predetermined angle q relative to longitudinal axis $X_{L701}$ (see e.g., angle θ FIG. 1C, 3B—$X_{L701}$) defined by key blade 701 of key 700.

Figures 2A, 2B, 2C, 2D:
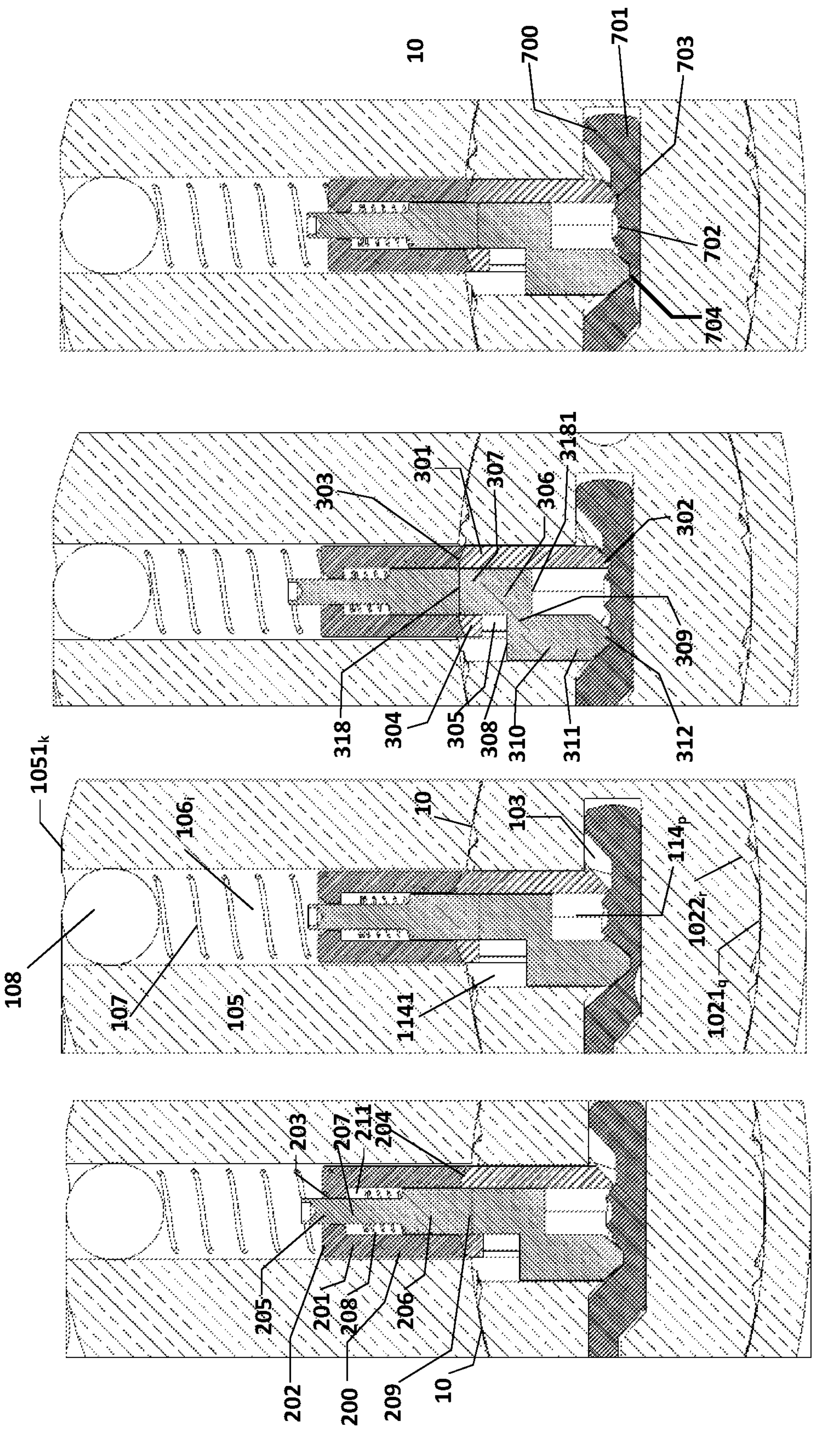
FIGS. 2A-2D, shows an enlarged illustration of FIG. 1A, illustrating possible shear line configurations resulting in the ability or inability to rotate the barrel.

An illustration of possible configurations that would enable or disable rotating barrel 102 in cylindrical lock housing 101 along shear line 10, is illustrated in FIGS. 2A-2D. As illustrated in FIG. 2A, wrong key blade 701 is inserted in keyway 103 engaging proximal ends 302 and 312. As illustrated, properly configured secondary engagement site 704 engages proximal end 312 of pin 311 of non-concentric member 310, thus axially moving non-concentric member 310, causing concentric member 307 distal end 318 to move axially in interrupted cylindrical housing 301 against proximal end 209 of piston 205 head portion 206, thus compressing spring 208 causing proximal end 209 of piston 205 head portion 206 to align with the interface crated by distal end 318 concentric member 307 along shear line 10. However, since improperly configured primary engagement site 703 (too shallow a cut, see e.g., FIG. 2D), is the wrong configuration, it engages proximal end 302 of interrupted cylindrical housing 301, causing distal end 303 of interrupted cylindrical housing 301 of barrel pin assembly 300A to abut proximal end 204 of interrupted cylindrical housing 201 of nested column pin assembly 200A and axially move interrupted cylindrical housing 201 distally (in other words, away from barrel 102) into column bore 106*i* against first biaser 107 and indirectly against stopper 108, in effect inserting a portion of interrupted cylindrical housing 301 into the corresponding i.sup.th column bore 106.sub.i, thus breaking shear line 10 preventing the rotation of barrel 102 in cylinder lock housing 101.

Similarly, as illustrated in FIG. 2B, wrong key blade 701 is inserted in keyway 103 engaging proximal ends 302 and 312. As illustrated, improperly configured secondary engagement site 704 (too deep a cut, see e.g., FIG. 2D), engages proximal end 312 of pin 311 of non-concentric member 310, thus axially moving non-concentric member 310, causing concentric member 307 distal end 318 to move axially in interrupted cylindrical housing 301 against proximal end 209 of piston 205 head portion 206, thus not compressing spring 208 enough, in effect allowing spring 208 to bias proximal end 209 of piston 205 head portion 206 to advance the interface crated by distal end 318 concentric member 307 and proximal end 209 of piston 205 head portion 206 beyond shear line 10, causing piston 205 head portion 206 to enter interrupted cylindrical housing 301 of barrel pin assembly 300A. Moreover, improperly configured primary engagement site 703 (too shallow a cut), engages proximal end 302 of interrupted cylindrical housing 301, causing distal end 303 of interrupted cylindrical housing 301 of barrel pin assembly 300A to abut proximal end 204 of interrupted cylindrical housing 201 of nested column pin assembly 200A and axially move interrupted cylindrical housing 201 distally (in other words, away from barrel 102) into column bore 106.sub.i against first biaser 107 and indirectly against stopper 108, in effect inserting a portion of interrupted cylindrical housing 301 of barrel pin assembly 300A into the corresponding i.sup.th column bore 106.sub.i, thus breaking shear line 10 preventing the rotation of barrel 102 in cylinder lock housing 101.

Conversely, FIG. 2C, illustrates an embodiment wherein the right key blade 701 is inserted in keyway 103 engaging proximal ends 302 and 312. As illustrated, properly configured secondary engagement site 704 (see e.g., FIG. 2D) engages proximal end 312 of pin 311 of non-concentric member 310, thus axially moving non-concentric member 310, causing concentric member 307 distal end 318 to move axially in interrupted cylindrical housing 301 of barrel pin assembly 300A against proximal end 209 of piston 205 head portion 206, thus compressing spring 208 causing proximal end 209 of piston 205 head portion 206 to align with the interface crated by distal end 318 concentric member 307, along shear line 10. Likewise properly configured primary engagement site 703 engages proximal end 302 of barrel pin assembly 300A interrupted cylindrical housing 301, causing distal end 303 of interrupted cylindrical housing 301 of barrel pin assembly 300A to abut proximal end 204 of interrupted cylindrical housing 201 of nested column pin assembly 200A and axially move interrupted cylindrical housing 201 distally (in other words, away from barrel 102) against first biaser 107 and indirectly against stopper 108, thus aligning the interface formed by distal end 303 of barrel pin assembly 300A interrupted cylindrical housing 301 and proximal end 204 of nested column pin assembly 200A interrupted cylindrical housing 201, to align with shear line 10 thus allowing the rotation of barrel 102 in cylinder lock housing 101.

A different embodiment is illustrated in FIG. 2D. As illustrated, properly configured primary engagement site 703 engages proximal end 302 of interrupted cylindrical housing 301, causing distal end 303 of interrupted cylindrical housing 301 of barrel pin assembly 300A to abut proximal end 204 of interrupted cylindrical housing 201 of nested column pin assembly 200A and axially move interrupted cylindrical housing 201 distally (in other words, away from barrel 102) against first biaser 107 and indirectly against stopper 108, thus aligning the interface formed by distal end 303 of interrupted cylindrical housing 301 and proximal end 204 of interrupted cylindrical housing 201 of nested column pin assembly 200A to align with shear line 10. However, improperly configured secondary engagement site 704 (too deep a cut), engages proximal end 312 of pin 311 of non-concentric member 310, thus axially moving non-concentric member 310, causing concentric member 307 distal end 318 not to move axially in interrupted cylindrical housing 301 sufficiently against proximal end 209 of piston 205 head portion 206, such that spring 208 is not compressed enough, in effect allowing spring 208 to bias proximal end 209 of piston 205 head portion 206 causing it to advance the interface crated by distal end 318 concentric member 307 beyond shear line 10, causing piston 205 head portion 206 to enter interrupted cylindrical housing 301 of barrel pin assembly 300A and preventing the rotation of barrel 102 in cylinder lock housing 101.

As illustrated in FIGS. 2A-2D, the interface formed by distal end 303 of interrupted cylindrical housing 301 of barrel pin assembly 300A and proximal end 204 of interrupted cylindrical housing 201 of nested column pin assembly 200A; and the interface crated by distal end 318 concentric member 307 and proximal end 209 of piston 205 head portion 206, are capable of moving axially independent of each other by engagement of primary site 703 and non-concentric, secondary site 704, only the proper configuration of both will lead to an uninterrupted sear line 10, enabling the rotation of barrel 102 in cylinder lock housing 101.

Figure 3A:
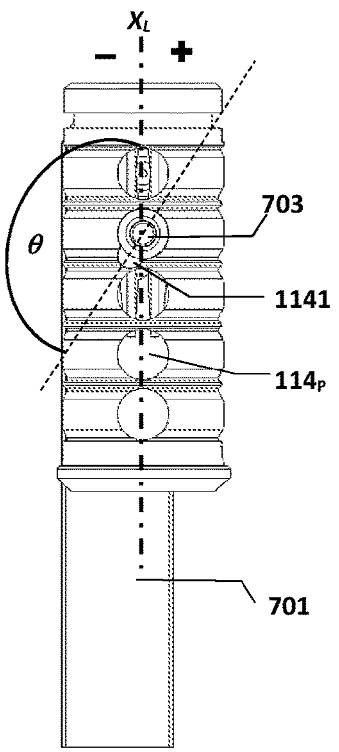
FIGS. 3A-3C, illustrate the axial canal shape cut into the barrel bores that are shaped, sized and configured to accommodate the eccentric member of the barrel pin assemblies.
Figure 3B:
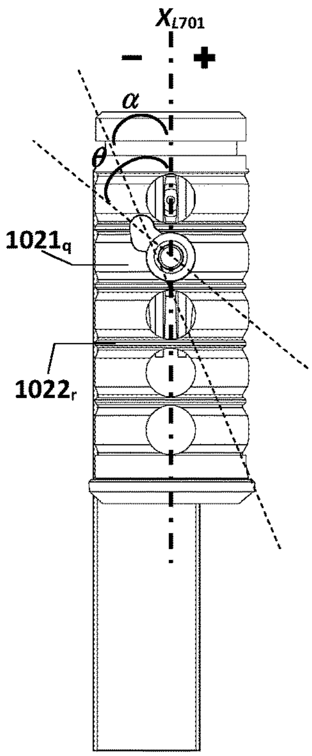
Figure 3C:
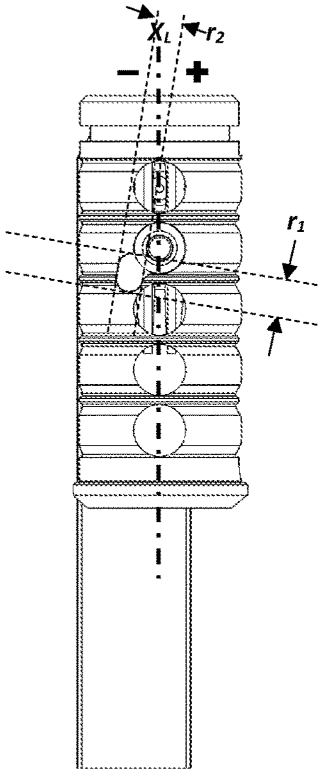

Turning now to FIGS. 1C, and 3A-3C, illustrating the various embodiments of the spatial configuration of non-concentric member 310, which extends radially from concentric member 307 at a predetermined angle θ relative to longitudinal axis $X_{L701}$ defined by key blade 701 of key 700. Moreover, each barrel bore $\mathbf{114}_P$ accommodating one of barrel pin assemblies 300A (see e.g., FIG. 1B), 300B (see e.g., FIG. 6C), 300C (see e.g., FIG. 6B), 300D (see e.g., FIG. 6D), 300E (see e.g., FIG. 7B), or 300F (see e.g., FIG. 6A) can further comprises axial canal 1141, extending radially from barrel bore $\mathbf{114}_p$ at same predetermined angle θ relative to longitudinal axis $X_{L701}$ defined by key blade 701 of key 700. Axial canal 1141 has radial cross section (in other words, cross section transverse to the canal's longitudinal axis), which can be sized, shaped and configured to accommodate the axial movement of non-concentric member 310. As illustrated, predetermined angle θ can be between about 15° and about 165° relative to longitudinal axis $X_{L701}$ defined by key blade 701 of key 700. This would allow a substantial increase in the number of cut configurations of the combination cylinder lock 100 and key 700. As illustrated in FIGS. 3B and 3C, axial canal 1141 can be shaped for allowing the axial movement (along axial canal 1141 longitudinal axis), by for example having a cross section that is configured to have a cross section complimentary to the cross section of barrel pin assembly's 300D non-concentric member 322 (see e.g., FIG. 6D).

Figure 4A:
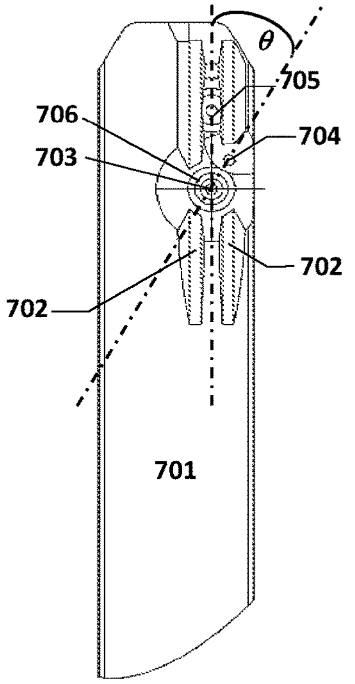
FIGS. 4A-4D, illustrate key combination surface that has a plurality of engagement sites configured to engage certain barrel pin assemblies illustrated in the figures.
Figure 4B:
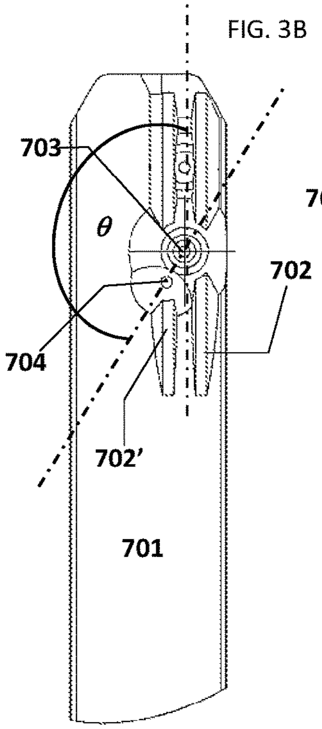
Figure 4C:
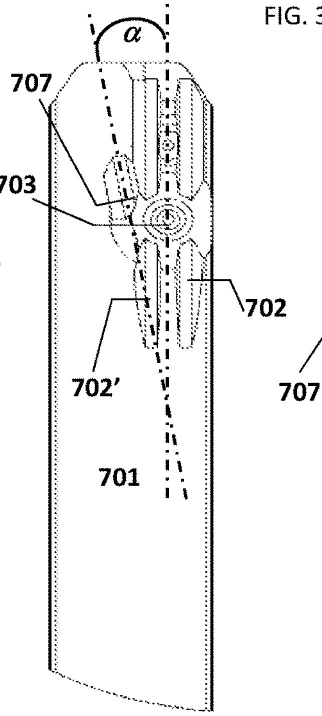
Figure 4D:
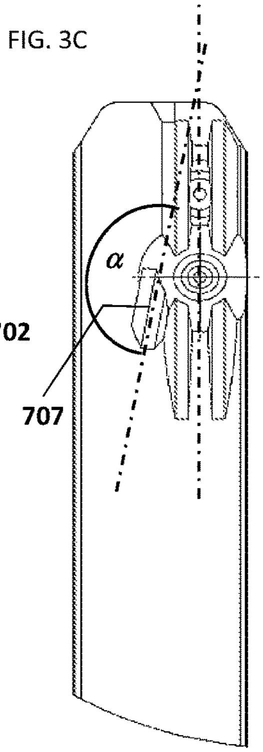
Figures 6A, 6B, 6C, 6D:
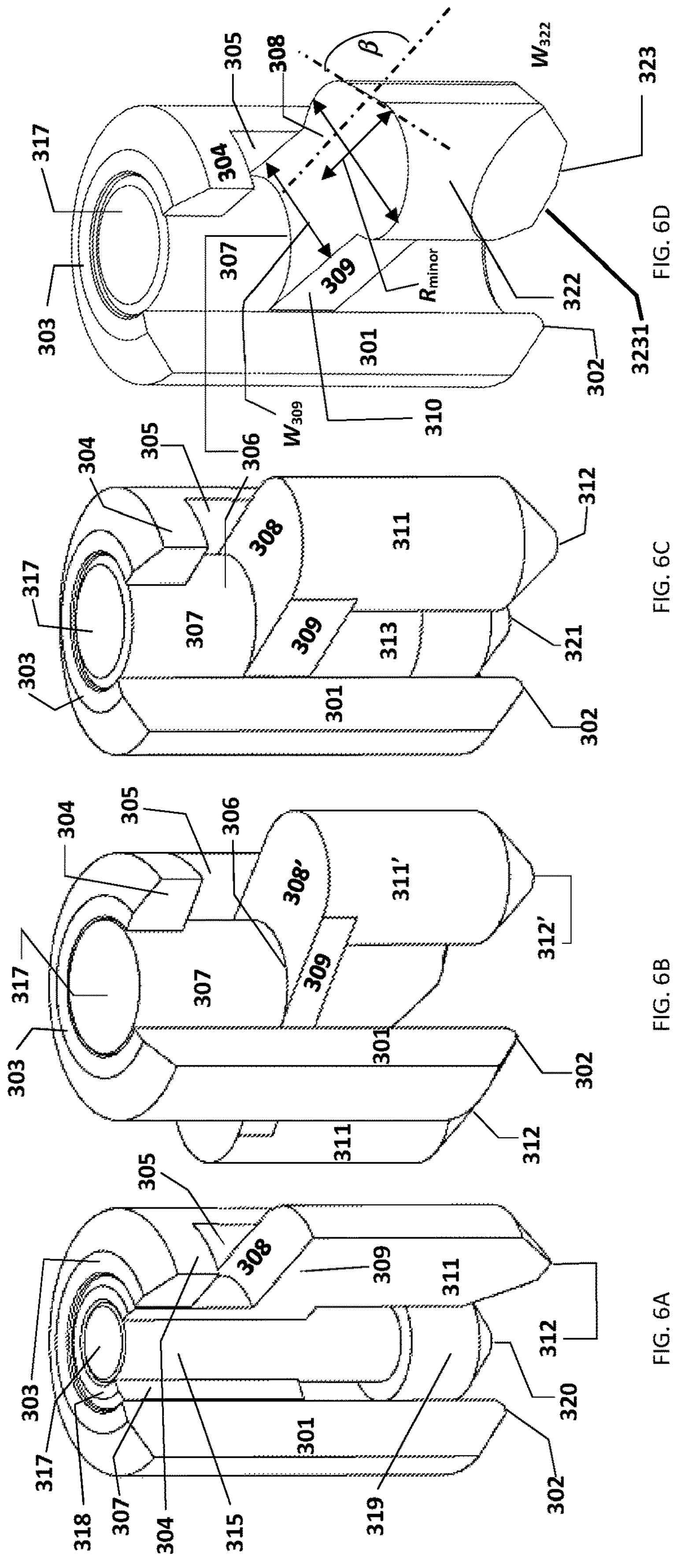
FIGS. 6A-6D, are an isometric illustration of certain embodiments of the eccentric barrel pin assembly with two contact points within the keyway.
Figure 7A:
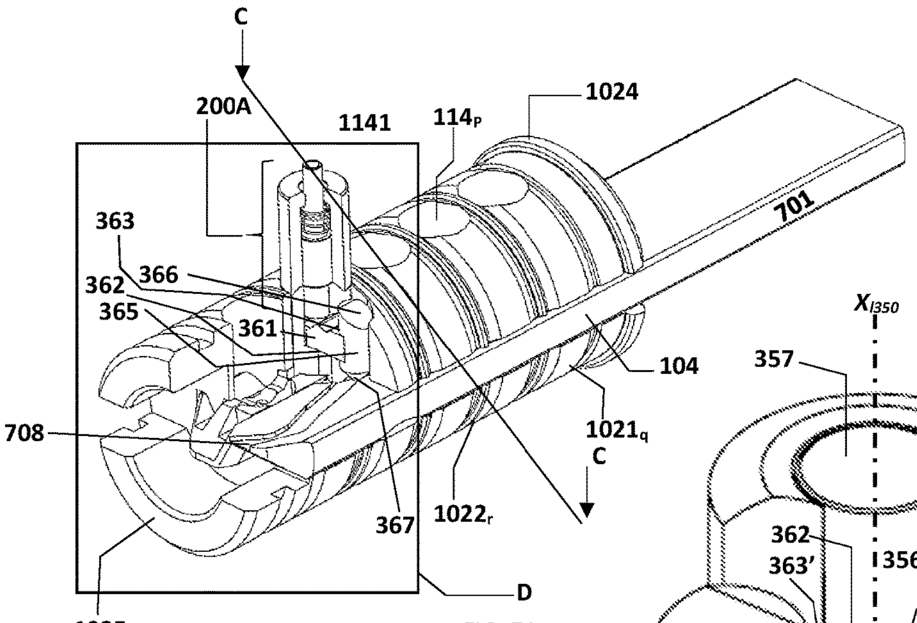
FIG. 7A is an isometric cut-away of another embodiment of the certain embodiments of the eccentric barrel pin assembly, the barrel, the key and the nested column pin assembly, FIG. 7B being an isometric illustration of the barrel pin assembly illustrated in FIG. 7A, with FIG. 7C illustrating a X-Z cross section thereof along line C-C resulting in successful rotation of the barrel and FIG. 7D illustrating a X-Z cross section thereof along line C-C resulting in unsuccessful rotation of the barrel.
Figure 7B:
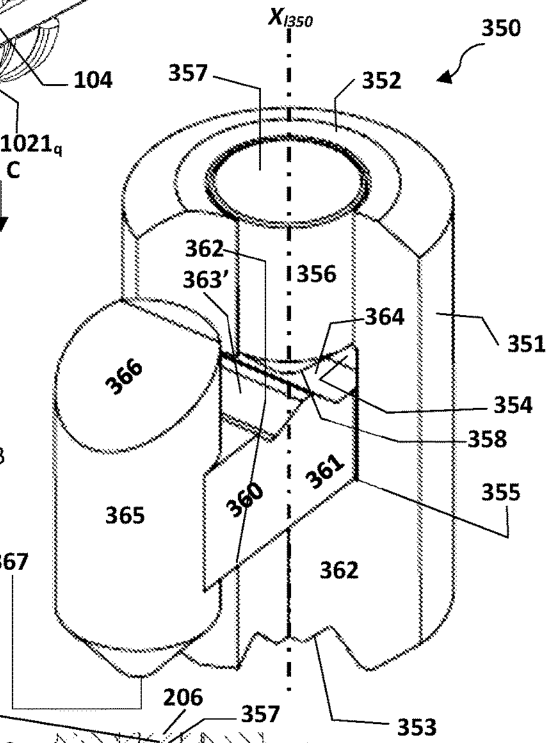

Accordingly and in an embodiment illustrated in FIGS. 6D, 4C and 4D, barrel pin assembly 300D can comprise: axially interrupted cylindrical housing 301 of barrel pin assembly 300D, defining longitudinal axis $X_L$ and having proximal 302 end and open distal end 303, axially interrupted cylindrical housing 301 further defining shelf 304 disposed distally to opening 305 in axially interrupted cylindrical housing 301 of barrel pin assembly 300D, wherein proximal end 302 of axially interrupted cylindrical housing 301 of barrel pin assembly 300D, is sized, shaped and configured to be engaged in primary engagement site 703 (See e.g., FIG. 4C) on key 700 key blade 701. Barrel pin assembly 300D can further comprise shuttle member 306, slidably coupled to axially interrupted cylindrical housing 301 (of barrel pin assembly 300D), wherein shuttle member 306 comprises: concentric member 307 having distal end 318 and proximal end 3181, as well as non-concentric member 322 coupled radially, via extension 309, wherein non-concentric member 322 having distal end 308, extends radially from concentric member 307 at predetermined angle relative to longitudinal axis $X_{L701}$ (see e.g., FIG. 3B), defined by key blade 701 of key 700 and wherein non-concentric member 322 defines coned cylinder with proximal end 323 shaped, sized and configured for engagement in secondary engagement site 707 on key 700, non-concentric member 322 having an oval cross section with major axis $W_{322}$ that is larger than the width $W_{309}$ of extension 309. Moreover, as an added security measure, major axis $W_{322}$ can be disposed at predetermined angle α (see e.g., FIGS. 4C, 4D) to longitudinal axis $X_{L309}$ defined by extension 309, while longitudinal axis $X_{L309}$ defined by extension 309 can be offset from at same predetermined angle θ relative to longitudinal axis $X_{L701}$ defined by key blade 701 of key 700 (see e.g., FIG. 4C). Here too, predetermined angle θ can be between about 15° and about 165° relative to longitudinal axis X.sub.L701 defined by key blade 701 of key 700, while predetermined angle α can be between about 0° and about 90° relative to longitudinal axis $X_{L309}$ defined by extension 309 (see e.g., FIGS. 4C, 4D, and 6D). Moreover, since, non-concentric member 322 has an oval cross section, conical proximal end 323 can be frustrated (see e.g., FIG. 6D) thus forming an elongated facet edge 3231, such that secondary site 703 is modified to be tilted groove 707, shaped, sized and configured for engaging elongated facet edge 3231.

Other embodiments of barrel pin assembly 300, are provided in, for example barrel pin assembly 300B (see e.g., FIGS. 5B, and 6C) which comprises axially interrupted cylindrical housing 301 of barrel pin assembly 300B, defining longitudinal axis X.sub.L and having proximal 302 end and open distal end 303, axially interrupted cylindrical housing 301 further defining shelf 304 disposed distally to opening 305 in axially interrupted cylindrical housing 301 of barrel pin assembly 300B, wherein proximal end 302 of axially interrupted cylindrical housing 301 of barrel pin assembly 300B, is sized, shaped and configured to be engaged in primary engagement site 703 (See e.g., FIG. 4C) on key 700 key blade 701. Barrel pin assembly 300B further comprises shuttle member 306, slidably coupled to axially interrupted cylindrical housing 301 of barrel pin assembly 300B. Shuttle member 306 can comprises: concentric member 307 having distal end 318 and proximal end 3181. Proximal end 321 of concentric member 307 can be sized, shaped and configured to be engaged in coaxial engagement site 709 (see e.g., FIG. 9] on key 700 key blade 700 that is concentric with annular cut 706, both which form primary engagement site 703 (See e.g., FIG. 5B). Shuttle member 306 can further comprise non-concentric member 310 extending radially and proximally (or downwards) from concentric member's 306 proximal end 3181, with non-concentric member 310 having pin 311 distal end 308 and proximal end 312 shaped, sized and configured to be engaged in secondary engagement site 704 on the key 700 key-blade 701, wherein non-concentric member 310 extends radially from concentric member 307 at predetermined angle q relative to longitudinal axis $X_{L701}$ (see e.g., FIG. 1C, 3B) defined by key blade 701 of key 700.

Additional configuration is illustrated by barrel pin assembly 300C (see e.g., FIGS. 5C, and 6B), where barrel pin assembly 300C is illustrated showing axially interrupted cylindrical housing 301 of barrel pin assembly 300C defining the longitudinal axis $X_L$ and having proximal end 302 and open distal end 303, axially interrupted cylindrical housing 301 of barrel pin assembly 300C further defining shelf 304 disposed distally to opening 305, 305' in axially interrupted cylindrical housing 301 of barrel pin assembly 300C, wherein proximal end 302 of axially interrupted cylindrical housing 301 of barrel pin assembly 300C is sized, shaped and configured for engagement in primary engagement site 703, for example in annular cut 706 on key 700 key blade 701. Barrel pin assembly 300C further comprises shuttle member 306, slidably coupled to the axially interrupted cylindrical housing 301 of barrel pin assembly 300C, wherein shuttle member 306 comprises: concentric member 307 having distal end 318 and proximal end 3181, with pair of non-concentric members 311, 311' extending radially and proximally from concentric member's 307 proximal end 3181, the pair of non-concentric members 311, 311' each having distal end 308, 308' and proximal end 312, 312' shaped, sized and configured for engagement in secondary 704 and tertiary 704' engagement (not shown) sites on key 700 key blade 701, wherein each of the pair of non-concentric members 311, 311' extends radially from concentric member 307 at predetermined angle θ relative to longitudinal axis $X_{L701}$ defined by key 700 key blade 701. As illustrated in FIG. 5C, and in an embodiment, proximal ends 312, 312' of non-concentric members 311, 311' are sized and shaped differently from each other, as are secondary 704 and tertiary 704' engagement sites on key 700 key blade 701.

Yet another embodiment is illustrated in FIGS. 7A-9 showing barrel pin assembly 300E. As illustrated in these figures, barrel pin assembly 300E comprises: axially interrupted cylindrical housing 351 (see e.g., FIG. 7B) of barrel pin assembly 300E (350) defining longitudinal axis $X_{L351}$ while having closed proximal end 353 and open distal end 352, with opening in the axially interrupted cylindrical housing, the opening defining radial pathway 359, wherein closed proximal end 353 of axially interrupted cylindrical housing 301 of barrel pin assembly 300E is shaped, sized and configured for engaging primary engagement site 703 (which can be formed of at least annular cut 706, and coaxial engagement site 709) on key 700 key blade combination surface. Barrel pin assembly 350 (i.e. 300E) also comprises shuttle member, slidably coupled to the axially interrupted cylindrical housing, the shuttle member comprises: concentric cylindrical peg 356 having flat apical end 357 and proximally extending conical proximal end 358, the conical proximal end 358 sized, shaped and configured for engaging portion of sliding member 360. The sliding member is comprised of radially extending slab 361 radially slidable within radial pathway 359, having flat basal surface 362 and ridged apical surface 363 with depression 364 disposed between two ridges 363', 363'', wherein depression 364 being sized, shaped and configured to engage conical proximal end 358 of concentric cylindrical peg 357. Sliding member 360 further comprising radial dowel 365 having curved apical surface 366 and basally extending conical surface 367 radially coupled to sliding member 360, via, for example radially extending slab 361, wherein basally extending conical surface 367 is sized, shaped and configured to be engaged in undulating channel 708 (see e.g., FIG. 9) cut in key 700 key blade 701, and wherein sliding member 360 and radial dowel 365 extend radially from concentric cylindrical peg 357 at predetermined angle θ relative to longitudinal axis $X_{L701}$ defined by key 700 elongated key blade 701.

Figure 7D:
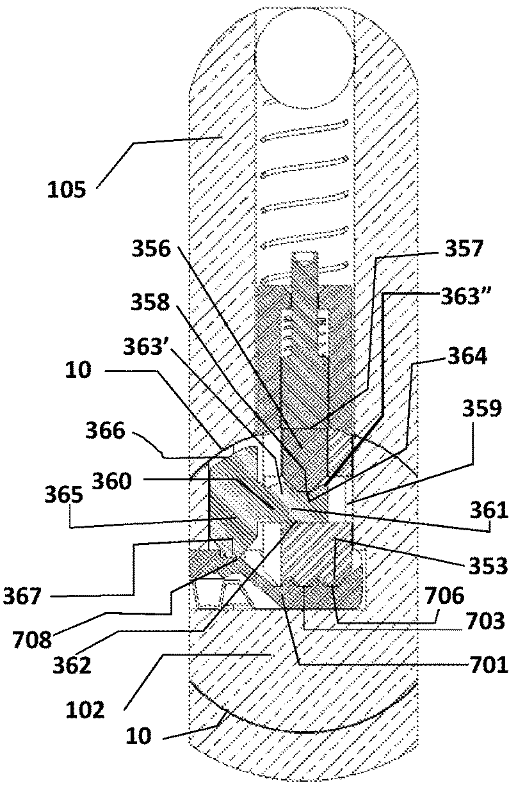
Figure 7C:
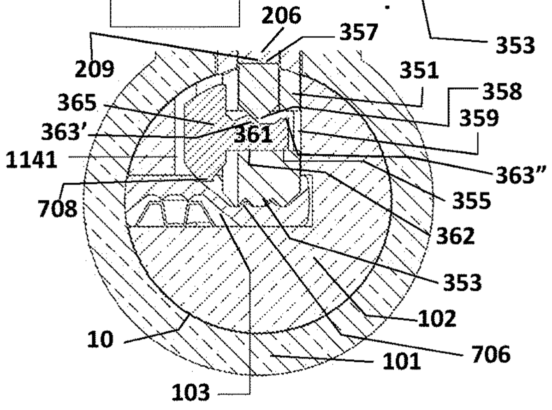
Figure 8:
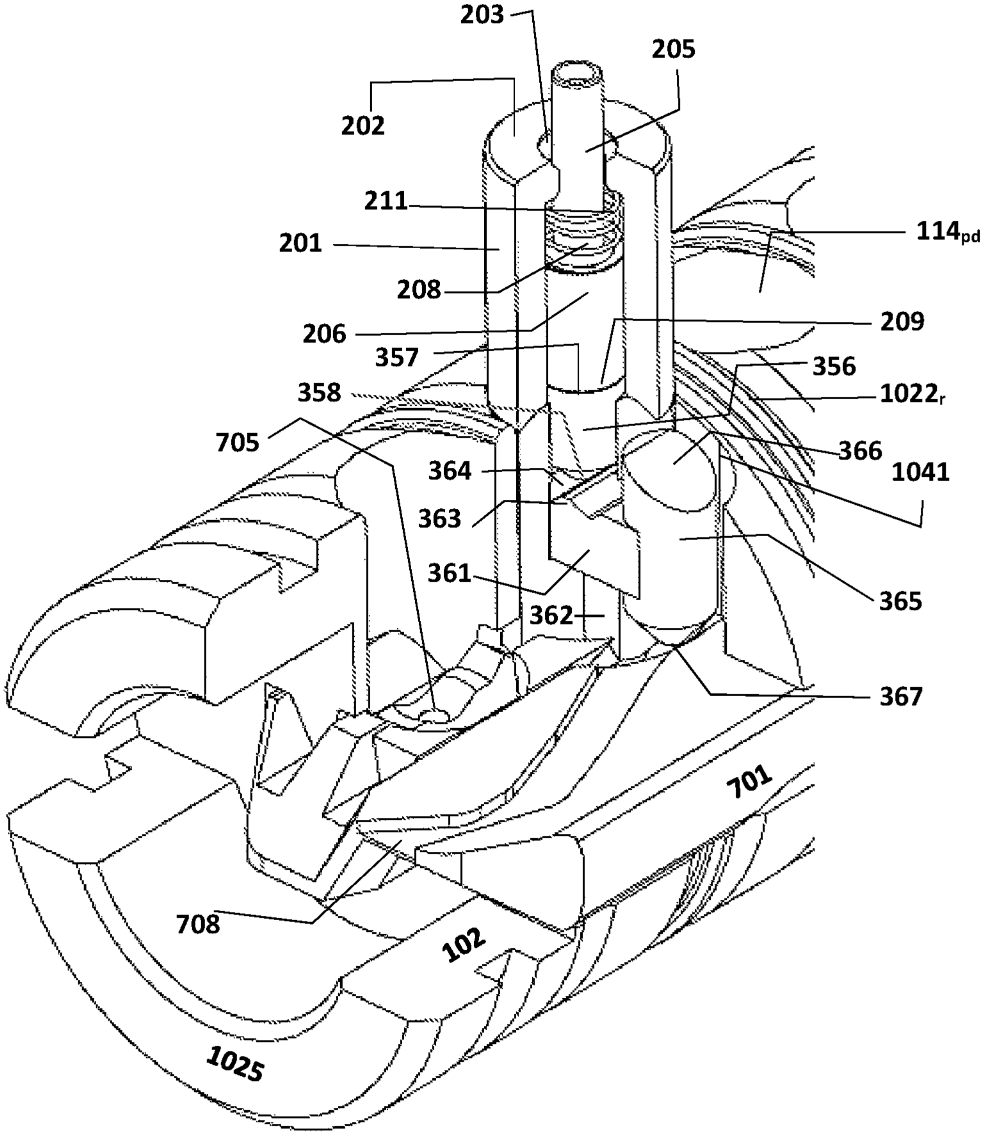
FIG. 8 is an enlarged portion D of FIG. 7A.
Figure 9:
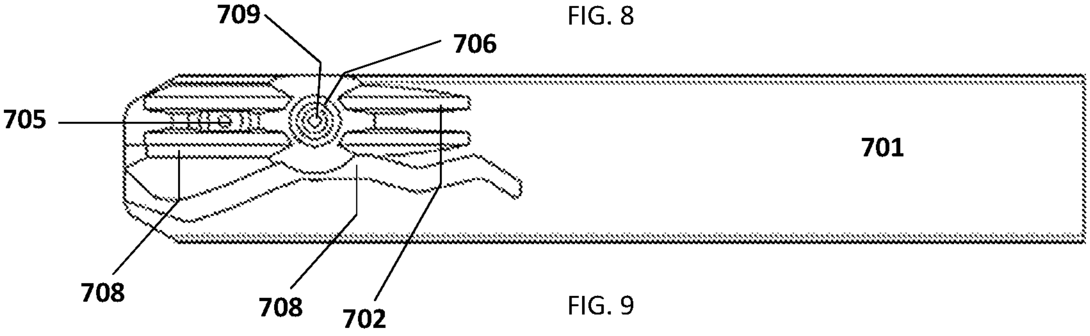
FIG. 9 illustrates key combination surface that has a plurality of engagement sites and undulating channel configured to engage the non-concentric member of barrel pin assembly that is illustrated in FIG. 7B.

Turning now to FIGS. 7C, 7D, and 9. FIG. 7C, illustrates an improper key/lock combination, whereby inserting key blade 701 in keyway 103, wherein properly configured primary engagement site 703 engages proximal end 353 of barrel pin assembly 350 (300E) interrupted cylindrical housing 351, causing open distal end 352 of interrupted cylindrical housing 351 of barrel pin assembly 350 (300E) to abut proximal end 204 of interrupted cylindrical housing 201 of nested column pin assembly 200A and axially move interrupted cylindrical housing 201 distally (in other words, away from barrel 102) against first biaser 107 and indirectly against stopper 108, thus aligning the interface formed by open distal end 352 of barrel pin assembly 350 (300E) interrupted cylindrical housing 351 and proximal end 204 of nested column pin assembly 200A interrupted cylindrical housing 201, with shear line 10. Conversely however, basally extending conical surface 367 of (non-concentric) radial dowel 365, which is sized, shaped and configured to be engaged in undulating channel 708 (see e.g., FIG. 9) cut in key 700 key blade 701, slidably translates sliding member 360 in a reciprocating manner within radial pathway 359, eventually causing concentric cylindrical peg's 356 proximally extending conical proximal end 358 to abut ridged apical surface 363 of sliding member 360 not on depression 364, but rather on the slopes of ridge 363', thus elevating concentric cylindrical peg 356 flat distal end 357 to move axially in interrupted cylindrical housing 351 against proximal end 209 of piston 205 head portion 206 (see e.g., FIG. 8), thus in effect moving proximal end 209 of piston 205 head portion 206 through the interface crated by flat distal end 357 of concentric cylindrical peg 356 and proximal end 209 of piston 205 head portion 206 beyond shear line 10, causing flat distal end 357 of concentric cylindrical peg 356 to enter interrupted cylindrical housing 201 of nested column pin assembly 200A and preventing the rotation of barrel 102 within cylinder lock housing 101.

Proper Key/lock combination is illustrated in FIG. 7D. As illustrated, properly configured primary engagement site 703 engages proximal end 353 of barrel pin assembly 350 (300E) interrupted cylindrical housing 351, causing open distal end 352 of interrupted cylindrical housing 351 of barrel pin assembly 350 (300E) to abut proximal end 204 of interrupted cylindrical housing 201 of nested column pin assembly 200A and axially move interrupted cylindrical housing 201 distally (in other words, away from barrel 102) against first biaser 107 and indirectly against stopper 108, thus aligning the interface formed by open distal end 352 of barrel pin assembly 350 (300E) interrupted cylindrical housing 351 and proximal end 204 of nested column pin assembly 200A interrupted cylindrical housing 201, with shear line 10. Similarly, basally extending conical surface 367 of (non-concentric) radial dowel 365, which is sized, shaped and configured to be engaged in undulating channel 708 (see e.g., FIG. 9) cut in key 700 key blade 701, slidably translates sliding member 360 within radial pathway 359, causing concentric cylindrical peg's 356 proximally extending conical proximal end 358 to abut ridged apical surface 363 of sliding member 360 in depression 364, thus urging concentric cylindrical peg 356 flat distal end 357 to move the interface crated by flat distal end 357 of concentric cylindrical peg 356 and proximal end 209 of piston 205 head portion 206 to align with shear line 10 (see e.g., FIG. 8), and since now both interfaces are aligned with shear line 10 the rotation of barrel 102 within cylinder lock housing 101 can be actuated.

Figure 5A:
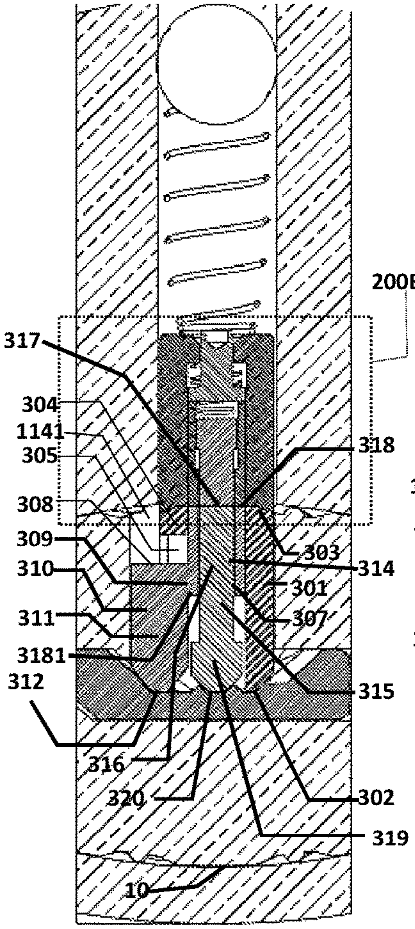
FIG. 5A-5C, are a X-Z cross section illustration of certain embodiments of the eccentric barrel pin assembly with two contact points within the keyway, with FIG. 5D being an enlarged portion of FIG. 5A.
Figure 5B:
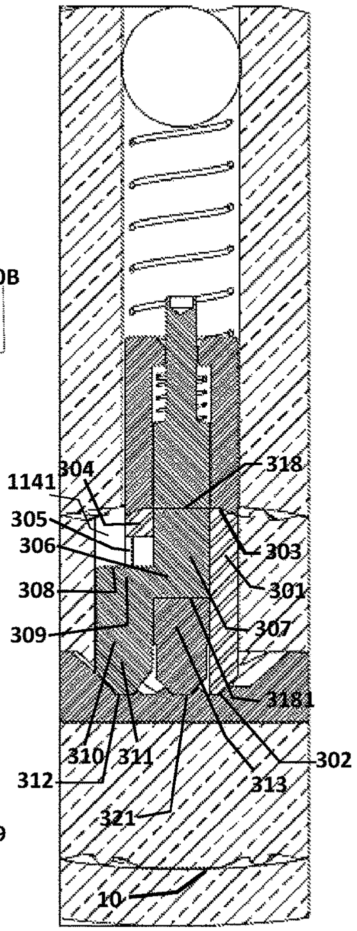
Figure 5C:
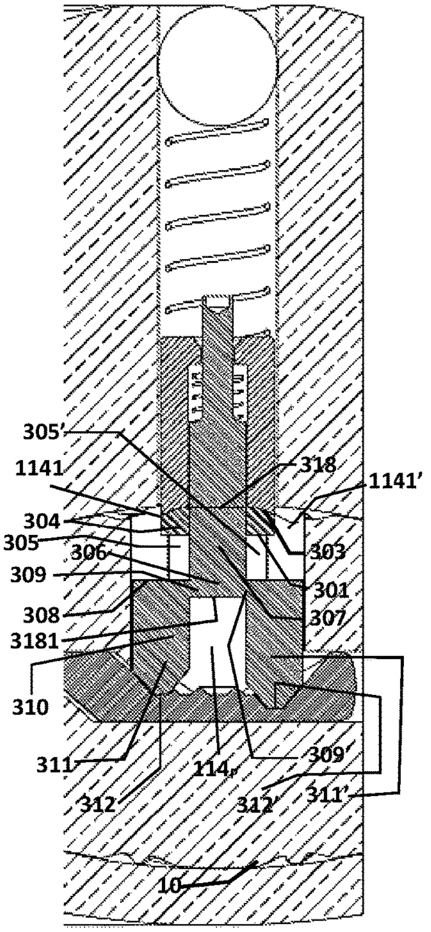
Figure 5D:
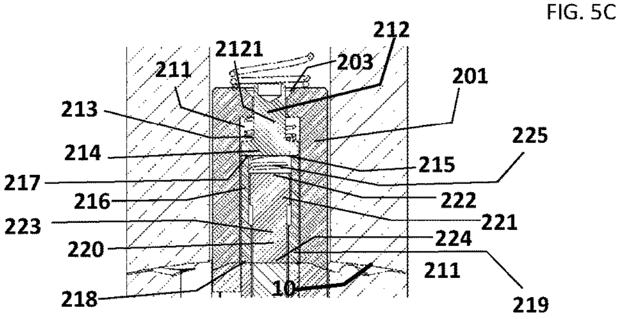

Additionally, or alternatively nested column pin assembly 200B (see e.g., FIG. 5D) can be used in combination with barrel pin assembly 300F (see e.g., FIGS. 5A, 5D, and 6A). Turning first to FIGS. 5A and 5D, illustrating nested column pin assembly 200B as comprising axially interrupted cylindrical housing 201 defining longitudinal axis $X_L$ having a closed distal end 202 and pen proximal end 204, with closed distal end 202 defining concentric aperture 203, wherein the axially interrupted cylindrical housing 201 of nested column pin assembly 200B is sized and configured for accommodating (in other words having a properly sized internal space forming tube 211) —flanged upper piston 213 and cylindrical sleeve member 214. As illustrated in FIG. 5D, flanged upper piston 212 having proximal flange 214 with a flat proximal end 215 and flanged upper piston stem 2121 extending distally from proximal flange 214, wherein flanged upper piston stem 2121 sized and configured to extend distally beyond aperture 203 defined in axially interrupted cylindrical housing 201 of nested column pin assembly 200B, further with upper spring 213 sized to sheath flanged upper piston stem 2121 disposed distally to proximal flange 214 of flanged upper piston 212 between the proximal flange 214 and the underside of axially interrupted cylindrical housing 201 of nested column pin assembly 200B, configured to bias flanged upper piston 212 away from axially interrupted cylindrical housing 201 of nested column pin assembly 200B. Axially interrupted cylindrical housing 201 of nested column pin assembly 200B further accommodates cylindrical sleeve member 216 disposed within axially interrupted cylindrical housing 201 of nested column pin assembly 200B, having open distal end 217 abutting proximal end 215 of proximal flange 214 of flanged upper piston 212, and open proximal end 218, wherein proximal end 218 of cylindrical sleeve 216 further defines an internal rim 219, sized and configured to accommodate a portion of nested column pin 220 (with upper flanged piston, the nested component). In turn, nested column pin 220, is comprised of distal flange 221 with flat distal flange end 222, and rod portion 223 with proximal end 224. Nested column pin assembly 200B further comprises nested biaser (e.g., spring) 225 disposed between flat distal flange end 222 of nested column pin 220 and flat proximal end 215 of flanged upper piston 212.

Corresponding barrel pin assembly 300F can comprise therefore an axially interrupted cylindrical housing 301 of barrel pin assembly 300F defining longitudinal axis $X_L$ and having proximal end 302 and open distal end 303, axially interrupted cylindrical housing 301 of barrel pin assembly 300F further defining shelf 304 disposed distally to opening 305 in axially interrupted cylindrical housing 301 of barrel pin assembly 300F, wherein proximal end 302 of axially interrupted cylindrical housing 301 of barrel pin assembly 300F can be sized and configured to be engaged in primary engagement site 703, for example in annular cut 706, on key 700 key blade 701. Barrel pin assembly 300F, is further comprised of shuttle member 306, slidably coupled to axially interrupted cylindrical housing 301 of barrel pin assembly 300F.

As illustrated in FIGS. 5A, and 6A, shuttle member 306 can comprise concentric member 307 having a distal end 328 and proximal end 338 (see e.g., FIG. 6A), concentric member 307 further defining axial shaft 314 extending therethrough (concentric member 307), wherein axial shaft 314 being sized and configured for accommodating portion of nested rod 315. Nested rod 315 can have rod tail 316 with flat tail distal end 317 and shaped head 319 disposed longitudinally proximal to rod tail 316, with shaped head 319 proximal end 320 wherein shaped end 319 proximal end 320 is sized, shaped and configured to be engaged in concentric engagement site 709 on key 700 key blade 701. Shuttle 306 further comprises non-concentric member 310 extending radially and proximally (or downwards) from concentric member's 307 proximal end 338, with non-concentric member 310 having pin 311 distal end 308 and proximal end 312 shaped, sized and configured to be engaged in secondary engagement site 704 on the key 700 key-blade 701, wherein non-concentric member 310 extends radially from concentric member 307 at predetermined angle q relative to longitudinal axis $X_{L701}$ (see e.g., FIG. 1C, 3A) defined by key blade 701 of key 700.

In an embodiment, provided herein are key and lock combinations configured to enable rotating the barrel within the cylinder lock's housing. Accordingly and in an embodiment, provided herein is lock and key combination comprising: cylinder lock 100 comprising nested column pin assembly 200A barrel pin assembly 300A and key 700 comprising generally elongate key blade 701, wherein key blade 701 comprising key 700 combination surface that has plurality of engagement sites 703, 704, 702, with: primary site 703, for example annular cut 706 sized, shaped configured to engage proximal end 302 of axially interrupted cylindrical housing 301 of barrel pin assembly 300A; and non-coaxial secondary site 704 sized shaped and configured to engage proximal end 312 of non-concentric member 310, wherein non-coaxial secondary site 704 is offset at predetermined angle θ from primary site 703 relative to longitudinal axis $X_{L701}$ defined by key blade 701 (see e.g., FIGS. 1C, and 3A).

Additionally or alternatively the lock and key combination can comprise: cylinder lock 100 comprising nested column pin assembly 200A barrel pin assembly 300B and key 700 comprising generally elongate key blade 701, wherein key blade 701 comprising key 700 combination surface that has plurality of engagement sites 703, 704, 702, with: primary site 703, for example annular cut 706 sized, shaped configured to engage proximal end 302 of axially interrupted cylindrical housing 301 of barrel pin assembly 300B; coaxial engagement site 709, being coaxial with primary site 703, wherein coaxial engagement site 709 is shaped sized and configured to engage proximal end 321 of coaxial member extension 313; and non-coaxial secondary site 704 sized shaped and configured to engage proximal end 312 of non-concentric member 310 pin 311, wherein non-coaxial secondary site 704 is offset at predetermined angle θ from primary site 703 relative to longitudinal axis $X_{L701}$ defined by key blade 701 (see e.g., FIGS. 1C, and 3A)

In yet another embodiment, the lock and key combination can comprise: cylinder lock 100 comprising nested column pin assembly 200A barrel pin assembly 300C and key 700 comprising generally elongate key blade 701, wherein key blade 701 comprising key 700 combination surface that has plurality of engagement sites 703, 704, 702, with: primary site 703, for example annular cut 706 sized, shaped configured to engage proximal end 302 of axially interrupted cylindrical housing 301 of barrel pin assembly 300C; non-coaxial secondary site 704 sized shaped and configured to engage proximal end 312 of one of the non-concentric members 311; and non-coaxial tertiary site 704' sized shaped and configured to engage the proximal end 312' of one of non-concentric members 311' not engaged by secondary site 704, wherein non-coaxial secondary and tertiary sites (704, 704; respectively) are offset at predetermined angle θ from primary site 703 relative to longitudinal axis $X_{L701}$ defined by key blade 701 (see e.g., FIGS. 1C, and 3A).

In yet another embodiment, the lock and key combination can comprise: cylinder lock 100 comprising nested column pin assembly 200A barrel pin assembly 300D and key 700 comprising generally elongate key blade 701, wherein key blade 701 comprising key 700 combination surface that has plurality of engagement sites 703, 704, 705, 702, with primary site 703, for example annular cut 706 sized, shaped configured to engage proximal end 302 of axially interrupted cylindrical housing 301 of barrel pin assembly 300D; and wherein secondary engagement site is tilted groove cut 707 offset at predetermined angle θ from primary site 703 relative to longitudinal axis $X_{L701}$ defined by key blade 701 (see e.g., FIGS. 3B, and 3C).

Moreover, in certain embodiment, cylinder lock 100 can comprise nested column pin assembly 200A barrel pin assembly 300E and key 700 comprising generally elongate key blade 701, wherein key blade 701 comprising key 700 combination surface that has plurality of engagement sites 703, 704, 705, 702, with primary site 703, for example annular cut 706 sized, shaped configured to engage closed proximal end 353 of axially interrupted cylindrical housing 351 of barrel pin assembly 300E, and undulating channel 708, sized, shaped and configured to engage basally extending conical surface 367 of radial dowel 365, wherein undulating channel 709 is configured to position sliding member 360 such that proximally extending conical proximal end 358 of cylindrical peg 356 is disposed in depression 364 between ridges 363' and 363" of ridged apical surface 363.

Additionally, Additionally or alternatively the lock and key combination can comprise: cylinder lock 100 comprising nested column pin assembly 200B barrel pin assembly 300F and key 700 comprising generally elongate key blade 701, wherein key blade 701 comprising key 700 combination surface that has plurality of engagement sites 703, 704, 705, 702, with: primary site 703, for example annular cut 706 sized, shaped configured to engage proximal end 302 of axially interrupted cylindrical housing 301 of barrel pin assembly 300F; coaxial engagement site 709, being coaxial with primary site 703, wherein coaxial engagement site 709 is shaped sized and configured to engage proximal end 320 of shaped head 319 of nested rod 316; and non-coaxial secondary site 704 sized shaped and configured to engage proximal end 312 of non-concentric member 310 pin 311, wherein non-coaxial secondary site 704 is offset at predetermined angle θ from primary site 703 relative to longitudinal axis $X_{L701}$ defined by key blade 701.

The term "about", when used in the description of the technology and/or claims means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such and may include the end points of any range provided including, for example ±25%, or ±20%, specifically, ±15%, or ±10%, more specifically, ±5% of the indicated value of the disclosed amounts, sizes, formulations, parameters, and other quantities and characteristics.

All ranges disclosed herein are inclusive of the endpoints, and the endpoints are independently combinable with each other. "Combination" is inclusive of blends, mixtures, alloys, reaction products, and the like. Furthermore, the terms "first," "second," and the like, herein do not denote any order, quantity, or importance, but rather are used to denote one element from another. The terms "a", "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the device(s) includes one or more device). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

As used herein, the language referring in certain embodiments to "sized, shaped and configured" refer to complimentary surfaces that facilitate the interaction indicated, for example, engaging the proximal ends of various components by the engagement sites cut into the surfaces of the key blade, whether annular cuts 706, undulating channel 708, coaxial engagement site 709, axial grooves 702, and/or tilted groove(s) 707.

Accordingly and in an embodiment, provided herein is a cylinder lock, comprising: a barrel having an axial keyway and a plurality of barrel bores extending radially from, and in communication with, the keyway, the barrel being selectably rotatably movable within a cylindrical housing; the cylindrical housing having a column with a plurality of column bores extending radially from said barrel comprising a barrel pin assembly slidably movable within the barrel bore, wherein the barrel pin assembly comprising at least two, non-concentric engaging proximal ends, configured, when engaged by a key having at least two engagement sites, to slidably and independently translate along the barrel bore's longitudinal axis to a shear line against a single nested column pin assembly located in a corresponding column bore; a stopper disposed at the distal end of each column bore; and a biaser disposed within each column bore, sized and configured to bias the nested column pin assembly towards the barrel, wherein (i) the nested column pin assembly comprises: an axially interrupted cylindrical housing defining a longitudinal axis and having a closed distal end and an open proximal end, the closed distal end defining a concentric aperture, wherein the axially interrupted cylindrical housing is sized and configured to accommodate an axially movable piston; the piston having a head portion with a flat proximal end and a stem extending distally from the head portion, the stem sized and configured to extend distally beyond the aperture defined in the axially interrupted cylindrical housing of the nested column pin assembly; and a spring sized to sheath the stem disposed distally to the head portion of the piston between the head portion and the axially interrupted cylindrical housing, configured to bias the piston away from the axially interrupted cylindrical housing, (ii) the barrel pin assembly comprises: an axially interrupted cylindrical housing defining a longitudinal axis and having a proximal end and an open distal end, the axially interrupted cylindrical housing further defining a shelf disposed distally to an opening in the axially interrupted cylindrical housing, wherein the proximal end of the axially interrupted cylindrical housing is sized and configured to be engaged in a primary engagement site on the key; and a shuttle member, slidably coupled to the axially interrupted cylindrical housing, the shuttle member comprises: a concentric member having a distal end and a proximal end; and a non-concentric member extending radially and proximally from the concentric member's proximal end, the non-concentric member having a distal end and a proximal end shaped, sized and configured to be engaged in a secondary engagement site on the key, wherein the non-concentric member extends radially from the concentric member at a predetermined angle relative to a longitudinal axis defined by a blade of the key, wherein (iii) the barrel pin assembly comprises: an axially interrupted cylindrical housing defining a longitudinal axis and having a proximal end and an open distal end, the axially interrupted cylindrical housing further defining a shelf disposed distally to an opening in the axially interrupted cylindrical housing, wherein the proximal end of the axially interrupted cylindrical housing is shaped, sized and configured to be engaged in the primary engagement site on the key; and a shuttle member, slidably coupled to the axially interrupted cylindrical housing, the shuttle member comprises: a concentric member having a distal end and a proximal end, the proximal end of the concentric member sized and configured to be engaged in a coaxial engagement site on the key that is concentric with the primary engagement site; and a non-concentric member extending radially and proximally from the concentric member, the non-concentric member having a distal end and a proximal end shaped, sized and configured to be engaged in the secondary engagement site on the key, wherein the non-concentric member extends radially from the concentric member at a predetermined angle relative to the longitudinal axis defined by the blade of the key, wherein (iv) the barrel pin assembly comprises: an axially interrupted cylindrical housing defining the longitudinal axis and having the proximal end and the open distal end, the axially interrupted cylindrical housing further defining the shelf disposed distally to the opening in the axially interrupted cylindrical housing, wherein the proximal end of the axially interrupted cylindrical housing is sized and configured to be engaged in the primary engagement site on the key; and a shuttle member, slidably coupled to the axially interrupted cylindrical housing, the shuttle member comprises: a concentric member having a distal end and a proximal end; and a pair of non-concentric members extending radially and proximally from the concentric member's proximal end, the pair of non-concentric members each having a distal end and a proximal end shaped, sized and configured to be engaged in the secondary and a tertiary engagement sites on the key, wherein each of the pair of non-concentric members extends radially from the concentric member at a predetermined angle relative to the longitudinal axis defined by the blade of the key, wherein (v) the barrel pin assembly comprises: an axially interrupted cylindrical housing defining the longitudinal axis and having the proximal end and the open distal end, the axially interrupted cylindrical housing further defining the shelf disposed distally to an opening in the axially interrupted cylindrical housing, wherein the proximal end of the axially interrupted cylindrical housing is sized and configured to be engaged in the primary engagement site on the key; and a shuttle member, slidably coupled to the axially interrupted cylindrical housing, the shuttle member comprises: a concentric member having a distal end and a proximal end; and a non-concentric member coupled radially via extension, the non-concentric member having a distal end, wherein the non-concentric member extends radially from the concentric member at a predetermined angle relative to the longitudinal axis defined by the blade of the key and wherein the non-concentric member defines a coned cylinder with a proximal end shaped, sized and configured to be engaged in the secondary engagement site on the key having an oval cross section with a major axis that is larger than the width of the extension, the major axis disposed at a predetermined angle to a longitudinal axis defined by the extension, wherein (vi) the barrel pin assembly comprises: an axially interrupted cylindrical housing defining a longitudinal axis and having a closed proximal end and an open distal end, with an opening in the axially interrupted cylindrical housing, the opening defining a radial pathway, wherein the closed proximal end of the axially interrupted cylindrical housing is shaped, sized and configured to be engaged in the primary engagement site on the key; and a shuttle member, slidably coupled to the axially interrupted cylindrical housing, the shuttle member comprises: a concentric cylindrical peg having a flat apical end and a proximally extending conical proximal end, the conical proximal end sized, shaped and configured to be engaged by a portion of a sliding member; the sliding member with a radially extending slab radially slidable within the radial pathway, having a flat basal surface and a ridged apical surface with a depression disposed between two ridges, wherein the depression is sized, shaped and configured to engage the conical proximal end of the concentric cylindrical peg; and a radial dowel having a curved apical surface and a basally extending conical surface radially coupled to the sliding member, wherein the basally extending conical surface is sized, shaped and configured to be engaged in an undulating channel cut on the key, and wherein the sliding member and the radial dowel extend radially from the concentric cylindrical peg at a predetermined angle relative to a longitudinal axis defined by the blade of the key, wherein (vii) the nested column pin assembly comprises: an axially interrupted cylindrical housing defining a longitudinal axis and having a closed distal end and an open proximal end, the closed distal end defining a concentric aperture, wherein the axially interrupted cylindrical housing is sized and configured to accommodate a flanged upper piston and a cylindrical sleeve member; the flanged upper piston having a proximal flange with a flat proximal end and a flanged upper piston stem extending distally from the flange, the flanged upper piston stem sized and configured to extend distally beyond the aperture defined in the axially interrupted cylindrical housing of the nested column pin assembly; an upper spring sized to sheath the flanged upper piston stem disposed distally to the flange of the upper piston between the flange and the axially interrupted cylindrical housing, configured to bias the flanged upper piston away from the axially interrupted cylindrical housing; the cylindrical sleeve member disposed within the axially interrupted cylindrical housing, having an open distal end abutting the proximal end of the flange of the flanged upper piston, and an open proximal end, wherein the proximal end of the cylindrical sleeve further defines an internal rim, sized and configured to accommodate a portion of a nested column pin; the nested column pin, having a distal flange with a flat distal flange end, and a rod portion with a proximal end; and a nested spring disposed between the distal flange end of the nested column pin and the flat proximal end of the flanged upper piston, (viii) the barrel pin assembly comprises: an axially interrupted cylindrical housing defining a longitudinal axis and having a proximal end and an open distal end, the axially interrupted cylindrical housing further defining a shelf disposed distally to an opening in the axially interrupted cylindrical housing, wherein the proximal end of the axially interrupted cylindrical housing is sized and configured to be engaged in a primary engagement site on the key; and a shuttle member, slidably coupled to the axially interrupted cylindrical housing, the shuttle member comprises: a concentric member having a distal end and a proximal end, the concentric member further defining an axial shaft extending there through, the axial shaft sized and configured to accommodate a portion of a nested rod; the nested rod, having a rod tail with a flat tail distal end and a shaped head disposed longitudinally proximal to the rod tail, with a shaped head proximal end wherein the shaped end proximal end is shaped and configured to be engaged in the engagement site on the key that is concentric with the primary engagement site; and a non-concentric member extending radially and proximally from the concentric member's proximal end, the non-concentric member having a distal end and a proximal end shaped, sized and configured to be engaged in the secondary engagement site on the key, wherein the non-concentric member extends radially from the concentric member at a predetermined angle relative to a longitudinal axis defined by a blade of the key, and (ix) wherein the barrel bore further comprises an axial canal extending radially from the barrel bore at the predetermined angle relative to the longitudinal axis defined by the blade of the key, the axial canal having radial cross section sized shaped and configured to accommodate the axial movement of the non-concentric member. The cylinder lock of claim 7, wherein the curved apical surface of the radial dowel defines a curvature that is complimentary to the curvature of the cylindrical housing, and wherein (x) wherein the curved apical surface of the radial dowel defines a curvature that is complimentary to the curvature of the cylindrical housing.

In another embodiment, provided herein is a lock and key combination comprising: a cylinder lock, comprising: a barrel having an axial keyway and a plurality of barrel bores extending radially from, and in communication with, the keyway, the barrel being selectably rotatably movable within a cylindrical housing; the cylindrical housing having a column with a plurality of column bores extending radially from said barrel comprising a barrel pin assembly slidably movable within the barrel bore, wherein the barrel pin assembly comprising at least two, non-concentric engaging proximal ends, configured, when engaged by a key having at least two engagement sites, to slidably and independently translate along the barrel bore's longitudinal axis to a shear line against a single nested column pin assembly located in a corresponding column bore; a stopper disposed at the distal end of each column bore; and a biaser disposed within each column bore, sized and configured to bias the nested column pin assembly towards the barrel, wherein the nested column pin assembly comprises: an axially interrupted cylindrical housing defining a longitudinal axis and having a closed distal end and an open proximal end, the closed distal end defining a concentric aperture, wherein the axially interrupted cylindrical housing is sized and configured to accommodate an axially movable piston; the piston having a head portion with a flat proximal end and a stem extending distally from the head portion, the stem sized and configured to extend distally beyond the aperture defined in the axially interrupted cylindrical housing of the nested column pin assembly; and a spring sized to sheath the stem disposed distally to the head portion of the piston between the head portion and the axially interrupted cylindrical housing, configured to bias the piston away from the axially interrupted cylindrical housing, the barrel pin assembly comprises: an axially interrupted cylindrical housing defining a longitudinal axis and having a proximal end and an open distal end, the axially interrupted cylindrical housing further defining a shelf disposed distally to an opening in the axially interrupted cylindrical housing, wherein the proximal end of the axially interrupted cylindrical housing is sized and configured to be engaged in a primary engagement site on the key; and a shuttle member, slidably coupled to the axially interrupted cylindrical housing, the shuttle member comprises: a concentric member having a distal end and a proximal end; and a non-concentric member extending radially and proximally from the concentric member's proximal end, the non-concentric member having a distal end and a proximal end shaped, sized and configured to be engaged in a secondary engagement site on the key, wherein the non-concentric member extends radially from the concentric member at a predetermined angle relative to a longitudinal axis defined by a blade of the key, the key comprising the generally elongate key blade, the key blade comprising a key combination surface that has a plurality of engagement sites, with: the primary site sized shaped and configured to engage the proximal end of the axially interrupted cylindrical housing; and the non-coaxial secondary site sized shaped and configured to engage the proximal end of the non-concentric member, wherein the non-coaxial secondary site is offset at a predetermined angle from the primary site relative to the longitudinal axis defined by the key blade.

In yet another embodiment, provided herein is a lock and key combination comprising: a cylinder lock, comprising: a barrel having an axial keyway and a plurality of barrel bores extending radially from, and in communication with, the keyway, the barrel being selectably rotatably movable within a cylindrical housing; the cylindrical housing having a column with a plurality of column bores extending radially from said barrel comprising a barrel pin assembly slidably movable within the barrel bore, wherein the barrel pin assembly comprising at least two, non-concentric engaging proximal ends, configured, when engaged by a key having at least two engagement sites, to slidably and independently translate along the barrel bore's longitudinal axis to a shear line against a single nested column pin assembly located in a corresponding column bore; a stopper disposed at the distal end of each column bore; and a biaser disposed within each column bore, sized and configured to bias the nested column pin assembly towards the barrel, wherein the nested column pin assembly comprises: an axially interrupted cylindrical housing defining a longitudinal axis and having a closed distal end and an open proximal end, the closed distal end defining a concentric aperture, wherein the axially interrupted cylindrical housing is sized and configured to accommodate an axially movable piston; the piston having a head portion with a flat proximal end and a stem extending distally from the head portion, the stem sized and configured to extend distally beyond the aperture defined in the axially interrupted cylindrical housing of the nested column pin assembly; and a spring sized to sheath the stem disposed distally to the head portion of the piston between the head portion and the axially interrupted cylindrical housing, configured to bias the piston away from the axially interrupted cylindrical housing, wherein the barrel pin assembly comprises: an axially interrupted cylindrical housing defining a longitudinal axis and having a proximal end and an open distal end, the axially interrupted cylindrical housing further defining a shelf disposed distally to an opening in the axially interrupted cylindrical housing, wherein the proximal end of the axially interrupted cylindrical housing is shaped, sized and configured to be engaged in the primary engagement site on the key; and a shuttle member, slidably coupled to the axially interrupted cylindrical housing, the shuttle member comprises: a concentric member having a distal end and a proximal end, the proximal end of the concentric member sized and configured to be engaged in a coaxial engagement site on the key that is concentric with the primary engagement site; and a non-concentric member extending radially and proximally from the concentric member, the non-concentric member having a distal end and a proximal end shaped, sized and configured to be engaged in the secondary engagement site on the key, wherein the non-concentric member extends radially from the concentric member at a predetermined angle relative to the longitudinal axis defined by the blade of the key; and the key comprising the generally elongate key blade, the key blade comprising the key combination surface that has a plurality of engagement sites, with: the primary site sized shaped and configured to engage the proximal end of the axially interrupted cylindrical housing; the coaxial engagement site, being coaxial with the primary site, wherein the coaxial engagement site is shaped sized and configured to engage the proximal end of the coaxial member; and the non-coaxial secondary site sized shaped and configured to engage the proximal end of the non-concentric member, wherein the secondary site is offset at a predetermined angle from the primary site relative to the longitudinal axis defined by the key blade.

In an embodiment, provided herein is a lock and key combination comprising: a cylinder lock, comprising: a barrel having an axial keyway and a plurality of barrel bores extending radially from, and in communication with, the keyway, the barrel being selectably rotatably movable within a cylindrical housing; the cylindrical housing having a column with a plurality of column bores extending radially from said barrel comprising a barrel pin assembly slidably movable within the barrel bore, wherein the barrel pin assembly comprising at least two, non-concentric engaging proximal ends, configured, when engaged by a key having at least two engagement sites, to slidably and independently translate along the barrel bore's longitudinal axis to a shear line against a single nested column pin assembly located in a corresponding column bore; a stopper disposed at the distal end of each column bore; and a biaser disposed within each column bore, sized and configured to bias the nested column pin assembly towards the barrel, wherein the nested column pin assembly comprises: an axially interrupted cylindrical housing defining a longitudinal axis and having a closed distal end and an open proximal end, the closed distal end defining a concentric aperture, wherein the axially interrupted cylindrical housing is sized and configured to accommodate an axially movable piston; the piston having a head portion with a flat proximal end and a stem extending distally from the head portion, the stem sized and configured to extend distally beyond the aperture defined in the axially interrupted cylindrical housing of the nested column pin assembly; and a spring sized to sheath the stem disposed distally to the head portion of the piston between the head portion and the axially interrupted cylindrical housing, configured to bias the piston away from the axially interrupted cylindrical housing, wherein the barrel pin assembly comprises: an axially interrupted cylindrical housing defining the longitudinal axis and having the proximal end and the open distal end, the axially interrupted cylindrical housing further defining the shelf disposed distally to the opening in the axially interrupted cylindrical housing, wherein the proximal end of the axially interrupted cylindrical housing is sized and configured to be engaged in the primary engagement site on the key; and a shuttle member, slidably coupled to the axially interrupted cylindrical housing, the shuttle member comprises: a concentric member having a distal end and a proximal end; and a pair of non-concentric members extending radially and proximally from the concentric member's proximal end, the pair of non-concentric members each having a distal end and a proximal end shaped, sized and configured to be engaged in the secondary and a tertiary engagement sites on the key, wherein each of the pair of non-concentric members extends radially from the concentric member at a predetermined angle relative to the longitudinal axis defined by the blade of the key; and the key comprising the generally elongate key blade, the key blade comprising a key combination surface that has a plurality of engagement sites, with: the primary site sized shaped and configured to engage the proximal end of the axially interrupted cylindrical housing; and the non-coaxial secondary site sized shaped and configured to engage the proximal end of one of the non-concentric members; and the non-coaxial tertiary site sized shaped and configured to engage the proximal end of one of the non-concentric members not engaged by the secondary site, wherein the non-coaxial secondary and tertiary sites are offset at a predetermined angle from the primary site relative to the longitudinal axis defined by the key blade.

In another embodiment, provided herein is a lock and key combination comprising: a cylinder lock, comprising: a barrel having an axial keyway and a plurality of barrel bores extending radially from, and in communication with, the keyway, the barrel being selectably rotatably movable within a cylindrical housing; the cylindrical housing having a column with a plurality of column bores extending radially from said barrel comprising a barrel pin assembly slidably movable within the barrel bore, wherein the barrel pin assembly comprising at least two, non-concentric engaging proximal ends, configured, when engaged by a key having at least two engagement sites, to slidably and independently translate along the barrel bore's longitudinal axis to a shear line against a single nested column pin assembly located in a corresponding column bore; a stopper disposed at the distal end of each column bore; and a biaser disposed within each column bore, sized and configured to bias the nested column pin assembly towards the barrel, wherein the nested column pin assembly comprises: an axially interrupted cylindrical housing defining a longitudinal axis and having a closed distal end and an open proximal end, the closed distal end defining a concentric aperture, wherein the axially interrupted cylindrical housing is sized and configured to accommodate an axially movable piston; the piston having a head portion with a flat proximal end and a stem extending distally from the head portion, the stem sized and configured to extend distally beyond the aperture defined in the axially interrupted cylindrical housing of the nested column pin assembly; and a spring sized to sheath the stem disposed distally to the head portion of the piston between the head portion and the axially interrupted cylindrical housing, configured to bias the piston away from the axially interrupted cylindrical housing; and the key comprising the generally elongate key blade, the key blade comprising a key combination surface that has a plurality of engagement sites, with: the primary site sized shaped and configured to engage the proximal end of the axially interrupted cylindrical housing; and the non-coaxial secondary site sized shaped and configured to engage the proximal end of the non-concentric member, wherein the non-coaxial secondary site is offset at a predetermined angle from the primary site relative to the longitudinal axis defined by the key blade wherein the secondary engagement site is a tilted groove cut at the predetermined angle from the primary site relative to the longitudinal axis defined by the key blade.

In yet another embodiment, provided herein is a lock and key combination comprising: a cylinder lock, comprising: a barrel having an axial keyway and a plurality of barrel bores extending radially from, and in communication with, the keyway, the barrel being selectably rotatably movable within a cylindrical housing; the cylindrical housing having a column with a plurality of column bores extending radially from said barrel comprising a barrel pin assembly slidably movable within the barrel bore, wherein the barrel pin assembly comprising at least two, non-concentric engaging proximal ends, configured, when engaged by a key having at least two engagement sites, to slidably and independently translate along the barrel bore's longitudinal axis to a shear line against a single nested column pin assembly located in a corresponding column bore; a stopper disposed at the distal end of each column bore; and a biaser disposed within each column bore, sized and configured to bias the nested column pin assembly towards the barrel, wherein the nested column pin assembly comprises: an axially interrupted cylindrical housing defining a longitudinal axis and having a closed distal end and an open proximal end, the closed distal end defining a concentric aperture, wherein the axially interrupted cylindrical housing is sized and configured to accommodate an axially movable piston; the piston having a head portion with a flat proximal end and a stem extending distally from the head portion, the stem sized and configured to extend distally beyond the aperture defined in the axially interrupted cylindrical housing of the nested column pin assembly; and a spring sized to sheath the stem disposed distally to the head portion of the piston between the head portion and the axially interrupted cylindrical housing, configured to bias the piston away from the axially interrupted cylindrical housing, wherein the barrel pin assembly comprises: an axially interrupted cylindrical housing defining a longitudinal axis and having a closed proximal end and an open distal end, with an opening in the axially interrupted cylindrical housing, the opening defining a radial pathway, wherein the closed proximal end of the axially interrupted cylindrical housing is shaped, sized and configured to be engaged in the primary engagement site on the key; and a shuttle member, slidably coupled to the axially interrupted cylindrical housing, the shuttle member comprises: a concentric cylindrical peg having a flat apical end and a proximally extending conical proximal end, the conical proximal end sized, shaped and configured to be engaged by a portion of a sliding member; the sliding member with a radially extending slab radially slidable within the radial pathway, having a flat basal surface and a ridged apical surface with a depression disposed between two ridges, wherein the depression is sized, shaped and configured to engage the conical proximal end of the concentric cylindrical peg; and a radial dowel having a curved apical surface and a basally extending conical surface radially coupled to the sliding member, wherein the basally extending conical surface is sized, shaped and configured to be engaged in an undulating channel cut on the key, and wherein the sliding member and the radial dowel extend radially from the concentric cylindrical peg at a predetermined angle relative to a longitudinal axis defined by the blade of the key; and the key comprising the generally elongate key blade, the key blade comprising a key combination surface that has a plurality of engagement sites, with: the primary site sized shaped and configured to engage the closed proximal end of the axially interrupted cylindrical housing; and the undulating channel, sized, shaped and configured to engage the basally extending conical surface of the radial dowel, wherein the undulating channel is configured to position the sliding member such that the proximally extending conical proximal end of the cylindrical peg is disposed in the depression between the two ridges of the ridged apical surface.

In an embodiment, provided herein is a lock and key combination comprising: cylinder lock, comprising: a barrel having an axial keyway and a plurality of barrel bores extending radially from, and in communication with, the keyway, the barrel being selectably rotatably movable within a cylindrical housing; the cylindrical housing having a column with a plurality of column bores extending radially from said barrel comprising a barrel pin assembly slidably movable within the barrel bore, wherein the barrel pin assembly comprising at least two, non-concentric engaging proximal ends, configured, when engaged by a key having at least two engagement sites, to slidably and independently translate along the barrel bore's longitudinal axis to a shear line against a single nested column pin assembly located in a corresponding column bore; a stopper disposed at the distal end of each column bore; and a biaser disposed within each column bore, sized and configured to bias the nested column pin assembly towards the barrel, wherein the nested column pin assembly comprises: an axially interrupted cylindrical housing defining a longitudinal axis and having a closed distal end and an open proximal end, the closed distal end defining a concentric aperture, wherein the axially interrupted cylindrical housing is sized and configured to accommodate a flanged upper piston and a cylindrical sleeve member; the flanged upper piston having a proximal flange with a flat proximal end and a flanged upper piston stem extending distally from the flange, the flanged upper piston stem sized and configured to extend distally beyond the aperture defined in the axially interrupted cylindrical housing of the nested column pin assembly; an upper spring sized to sheath the flanged upper piston stem disposed distally to the flange of the upper piston between the flange and the axially interrupted cylindrical housing, configured to bias the flanged upper piston away from the axially interrupted cylindrical housing; the cylindrical sleeve member disposed within the axially interrupted cylindrical housing, having an open distal end abutting the proximal end of the flange of the flanged upper piston, and an open proximal end, wherein the proximal end of the cylindrical sleeve further defines an internal rim, sized and configured to accommodate a portion of a nested column pin; the nested column pin, having a distal flange with a flat distal flange end, and a rod portion with a proximal end; and a nested spring disposed between the distal flange end of the nested column pin and the flat proximal end of the flanged upper piston, wherein the barrel pin assembly comprises: an axially interrupted cylindrical housing defining a longitudinal axis and having a proximal end and an open distal end, the axially interrupted cylindrical housing further defining a shelf disposed distally to an opening in the axially interrupted cylindrical housing, wherein the proximal end of the axially interrupted cylindrical housing is sized and configured to be engaged in a primary engagement site on the key; and a shuttle member, slidably coupled to the axially interrupted cylindrical housing, the shuttle member comprises: a concentric member having a distal end and a proximal end, the concentric member further defining an axial shaft extending there through, the axial shaft sized and configured to accommodate a portion of a nested rod; the nested rod, having a rod tail with a flat tail distal end and a shaped head disposed longitudinally proximal to the rod tail, with a shaped head proximal end wherein the shaped end proximal end is shaped and configured to be engaged in the engagement site on the key that is concentric with the primary engagement site; and a non-concentric member extending radially and proximally from the concentric member's proximal end, the non-concentric member having a distal end and a proximal end shaped, sized and configured to be engaged in the secondary engagement site on the key, wherein the non-concentric member extends radially from the concentric member at a predetermined angle relative to a longitudinal axis defined by a blade of the key; and the key comprising the generally elongate key blade, the key blade comprising the key combination surface that has a plurality of engagement sites, with: the primary site sized shaped and configured to engage the proximal end of the axially interrupted cylindrical housing; the coaxial engagement site, being coaxial with the primary site, wherein the coaxial engagement site is shaped sized and configured to engage the proximal end of the coaxial member; and the non-coaxial secondary site sized shaped and configured to engage the proximal end of the non-concentric member, wherein the secondary site is offset at a predetermined angle from the primary site relative to the longitudinal axis defined by the key blade, wherein the coaxial engagement site is shaped, sized and configured to engage the proximal end of the shaped head of the nested rod.

While particular embodiments have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

What is claimed:

1. A cylinder lock, comprising:

a. a barrel having an axial keyway and a plurality of barrel bores extending radially from, and in communication with, the keyway, the barrel being selectably rotatably movable within a cylindrical housing;

b. the cylindrical housing having a column with a plurality of column bores extending radially from said barrel comprising a barrel pin assembly slidably movable within a barrel bore, wherein the barrel pin assembly comprising at least two, non-concentric engaging proximal ends, configured, when engaged by a key having at least two engagement sites, to slidably and independently translate along the barrel bore's longitudinal axis to a shear line against a single nested column pin assembly located in a corresponding column bore; and wherein the nested column pin assembly comprises an axially interrupted cylindrical housing defining a longitudinal axis and having a closed distal end and an open proximal end, the closed distal end defining a concentric aperture, wherein the axially interrupted cylindrical housing is sized and configured to accommodate an axially movable piston;

c. a stopper disposed at the distal end of each column bore; and d. a biaser disposed within each column bore, sized and configured to bias the nested column pin assembly towards the barrel.

2. The cylinder lock of claim 1, wherein the nested column pin assembly further comprises:

a. the piston having a head portion with a flat proximal end and a stem extending distally from the head portion, the stem sized and configured to extend distally beyond the aperture defined in the axially interrupted cylindrical housing of the nested column pin assembly; and b. a spring sized to sheath the stem disposed distally to the head portion of the piston between the head portion and the axially interrupted cylindrical housing, configured to bias the piston away from the axially interrupted cylindrical housing.

3. The cylinder lock of claim 2, wherein the barrel pin assembly comprises:

a. an axially interrupted cylindrical housing defining a longitudinal axis and having a proximal end and an open distal end, the axially interrupted cylindrical housing further defining a shelf disposed distally to an opening in the axially interrupted cylindrical housing, wherein the proximal end of the axially interrupted cylindrical housing is sized and configured to be engaged in a primary engagement site on the key; and b. a shuttle member, slidably coupled to the axially interrupted cylindrical housing, the shuttle member comprises:

i. a concentric member having a distal end and a proximal end; and ii. a non-concentric member extending radially and proximally from the concentric member's proximal end, the non-concentric member having a distal end and a proximal end shaped, sized and configured to be engaged in a secondary engagement site on the key, wherein the non-concentric member extends radially from the concentric member at a predetermined angle relative to a longitudinal axis defined by a blade of the key.

4. The cylinder lock of claim 2, wherein the barrel pin assembly comprises:

a. an axially interrupted cylindrical housing defining a longitudinal axis and having a proximal end and an open distal end, the axially interrupted cylindrical housing further defining a shelf disposed distally to an opening in the axially interrupted cylindrical housing, wherein the proximal end of the axially interrupted cylindrical housing is shaped, sized and configured to be engaged in the primary engagement site on the key; and b. a shuttle member, slidably coupled to the axially interrupted cylindrical housing, the shuttle member comprises:

i. a concentric member having a distal end and a proximal end, the proximal end of the concentric member sized and configured to be engaged in a coaxial engagement site on the key that is concentric with the primary engagement site; and ii. a non-concentric member extending radially and proximally from the concentric member, the non-concentric member having a distal end and a proximal end shaped, sized and configured to be engaged in the secondary engagement site on the key, wherein the non-concentric member extends radially from the concentric member at a predetermined angle relative to the longitudinal axis defined by the blade of the key.

5. The cylinder lock of claim 2, wherein the barrel pin assembly comprises:

a. an axially interrupted cylindrical housing defining the longitudinal axis and having the proximal end and the open distal end, the axially interrupted cylindrical housing further defining a shelf disposed distally to the opening in the axially interrupted cylindrical housing, wherein the proximal end of the axially interrupted cylindrical housing is sized and configured to be engaged in the primary engagement site on the key; and b. a shuttle member, slidably coupled to the axially interrupted cylindrical housing, the shuttle member comprises:

i. a concentric member having a distal end and a proximal end; and ii. a pair of non-concentric members extending radially and proximally from the concentric member's proximal end, the pair of non-concentric members each having a distal end and a proximal end shaped, sized and configured to be engaged in a secondary and a tertiary engagement sites on the key, wherein each of the pair of non-concentric members extends radially from the concentric member at a predetermined angle relative to the longitudinal axis defined by the blade of the key.

6. The cylinder lock of claim 2, wherein the barrel pin assembly comprises:

a. an axially interrupted cylindrical housing defining the longitudinal axis and having the proximal end and the open distal end, the axially interrupted cylindrical housing further defining a shelf disposed distally to an opening in the axially interrupted cylindrical housing, wherein the proximal end of the axially interrupted cylindrical housing is sized and configured to be engaged in the primary engagement site on the key; and b. a shuttle member, slidably coupled to the axially interrupted cylindrical housing, the shuttle member comprises:

i. a concentric member having a distal end and a proximal end; and ii. a non-concentric member coupled radially via extension, the non-concentric member having a distal end, wherein the non-concentric member extends radially from the concentric member at a predetermined angle relative to the longitudinal axis defined by the blade of the key and wherein the non-concentric member defines a coned cylinder with a proximal end shaped, sized and configured to be engaged in a secondary engagement site on the key having an oval cross section with a major axis that is larger than the width of the extension, the major axis disposed at a predetermined angle to a longitudinal axis defined by the extension.

7. The cylinder lock of claim 2, wherein the barrel pin assembly comprises:

a. an axially interrupted cylindrical housing defining a longitudinal axis and having a closed proximal end and an open distal end, with an opening in the axially interrupted cylindrical housing, the opening defining a radial pathway, wherein the closed proximal end of the axially interrupted cylindrical housing is shaped, sized and configured to be engaged in the primary engagement site on the key;

b. and a shuttle member, slidably coupled to the axially interrupted cylindrical housing, the shuttle member comprises:

i. a concentric cylindrical peg having a flat apical end and a proximally extending conical proximal end, the conical proximal end sized, shaped and configured to be engaged by a portion of a sliding member;

ii. the sliding member with a radially extending slab radially slidable within the radial pathway, having a flat basal surface and a ridged apical surface with a depression disposed between two ridges, wherein the depression is sized, shaped and configured to engage the conical proximal end of the concentric cylindrical peg; and iii. a radial dowel having a curved apical surface and a basally extending conical surface radially coupled to the sliding member, wherein the basally extending conical surface is sized, shaped and configured to be engaged in an undulating channel cut on the key, and wherein the sliding member and the radial dowel extend radially from the concentric cylindrical peg at a predetermined angle relative to a longitudinal axis defined by the blade of the key.

8. The cylinder lock of claim 1, wherein the nested column pin assembly comprises:

a. an axially interrupted cylindrical housing defining a longitudinal axis and having a closed distal end and an open proximal end, the closed distal end defining a concentric aperture, wherein the axially interrupted cylindrical housing is sized and configured to accommodate a flanged upper piston and a cylindrical sleeve member;

b. the flanged upper piston having a proximal flange with a flat proximal end and a flanged upper piston stem extending distally from the flange, the flanged upper piston stem sized and configured to extend distally beyond the aperture defined in the axially interrupted cylindrical housing of the nested column pin assembly;

c. an upper spring sized to sheath the flanged upper piston stem disposed distally to the flange of the upper piston between the flange and the axially interrupted cylindrical housing, configured to bias the flanged upper piston away from the axially interrupted cylindrical housing;

d. the cylindrical sleeve member disposed within the axially interrupted cylindrical housing, having an open distal end abutting the proximal end of the flange of the flanged upper piston, and an open proximal end, wherein the proximal end of the cylindrical sleeve further defines an internal rim, sized and configured to accommodate a portion of a nested column pin;

e. the nested column pin, having a distal flange with a flat distal flange end, and a rod portion with a proximal end; and f. a nested spring disposed between the distal flange end of the nested column pin and the flat proximal end of the flanged upper piston.

9. The cylinder lock of claim 8, wherein the barrel pin assembly comprises:

a. an axially interrupted cylindrical housing defining a longitudinal axis and having a proximal end and an open distal end, the axially interrupted cylindrical housing further defining a shelf disposed distally to an opening in the axially interrupted cylindrical housing, wherein the proximal end of the axially interrupted cylindrical housing is sized and configured to be engaged in a primary engagement site on the key; and b. a shuttle member, slidably coupled to the axially interrupted cylindrical housing, the shuttle member comprises:

i. a concentric member having a distal end and a proximal end, the concentric member further defining an axial shaft extending there through, the axial shaft sized and configured to accommodate a portion of a nested rod;

ii. the nested rod, having a rod tail with a flat tail distal end and a shaped head disposed longitudinally proximal to the rod tail, with a shaped head proximal end wherein the shaped end proximal end is shaped and configured to be engaged in an engagement site on the key that is concentric with the primary engagement site; and iii. a non-concentric member extending radially and proximally from the concentric member's proximal end, the non-concentric member having a distal end and a proximal end shaped, sized and configured to be engaged in a secondary engagement site on the key, wherein the non-concentric member extends radially from the concentric member at a predetermined angle relative to a longitudinal axis defined by a blade of the key.

10. The cylinder lock of claim 3, wherein the barrel bore further comprises an axial canal extending radially from the barrel bore at the predetermined angle relative to the longitudinal axis defined by the blade of the key, the axial canal having radial cross section sized shaped and configured to accommodate the axial movement of the non-concentric member.

11. The cylinder lock of claim 7, wherein the curved apical surface of the radial dowel defines a curvature that is complimentary to the curvature of the cylindrical housing.

12. A lock and key combination comprising:

a. the cylinder lock of claim 3; and b. the key comprising a generally elongate key blade, the key blade comprising a key combination surface that has a plurality of engagement sites, with:

i. the primary engagement site sized shaped and configured to engage the proximal end of the axially interrupted cylindrical housing; and ii. a non-coaxial secondary engagement site sized shaped and configured to engage the proximal end of the non-concentric member, wherein the non-coaxial secondary engagement site is offset at a predetermined angle from the primary engagement site relative to the longitudinal axis defined by the key blade.

13. A lock and key combination comprising:

a. the cylinder lock of claim 4; and b. the key comprising a generally elongate key blade, the key blade comprising the key combination surface that has a plurality of engagement sites, with:

i. the primary engagement site sized shaped and configured to engage the proximal end of the axially interrupted cylindrical housing;

ii. a coaxial engagement site, being coaxial with the primary site, wherein the coaxial engagement site is shaped sized and configured to engage the proximal end of the coaxial member; and iii. a non-coaxial secondary engagement site sized shaped and configured to engage the proximal end of the non-concentric member, wherein the secondary engagement site is offset at a predetermined angle from the primary engagement site relative to the longitudinal axis defined by the key blade.

14. A lock and key combination comprising:

a. the cylinder lock of claim 5; and b. the key comprising a generally elongate key blade, the key blade comprising a key combination surface that has a plurality of engagement sites, with:

i. the primary engagement site sized shaped and configured to engage the proximal end of the axially interrupted cylindrical housing; and ii. a non-coaxial secondary engagement site sized shaped and configured to engage the proximal end of one of the non-concentric members; and iii. a non-coaxial tertiary engagement site sized shaped and configured to engage the proximal end of one of the non-concentric members not engaged by the secondary engagement site, wherein the non-coaxial secondary and tertiary engagement sites are offset at a predetermined angle from the primary engagement site relative to the longitudinal axis defined by the key blade.

15. A lock and key combination comprising:

a. the cylinder lock of claim 6; and b. the key comprising a generally elongate key blade, the key blade comprising a key combination surface that has a plurality of engagement sites, with:

i. the primary engagement site sized shaped and configured to engage the proximal end of the axially interrupted cylindrical housing; and ii. a non-coaxial secondary engagement site sized shaped and configured to engage the proximal end of the non-concentric member, wherein the non-coaxial secondary engagement site is offset at a predetermined angle from the primary site relative to the longitudinal axis defined by the key blade wherein the secondary engagement site is a tilted groove cut at the predetermined angle from the primary engagement site relative to the longitudinal axis defined by the key blade.

16. A lock and key combination comprising:

a. the cylinder lock of claim 7; and b. the key comprising a generally elongate key blade, the key blade comprising a key combination surface that has a plurality of engagement sites, with:

i. the primary engagement site sized shaped and configured to engage the closed proximal end of the axially interrupted cylindrical housing; and ii. the undulating channel, sized, shaped and configured to engage the basally extending conical surface of the radial dowel, wherein the undulating channel is configured to position the sliding member such that the proximally extending conical proximal end of the cylindrical peg is disposed in the depression between the two ridges of the ridged apical surface.

17. A lock and key combination comprising:

a. the cylinder lock of claim 9; and b. the key comprising a generally elongate key blade, the key blade comprising the key combination surface that has a plurality of engagement sites, with:

i. the primary engagement site sized shaped and configured to engage the proximal end of the axially interrupted cylindrical housing;

ii. a coaxial engagement site, being coaxial with the primary site, wherein the coaxial engagement site is shaped sized and configured to engage the proximal end of a coaxial member; and iii. a non-coaxial secondary engagement site sized shaped and configured to engage the proximal end of the non-concentric member, wherein the secondary engagement site is offset at a predetermined angle from the primary site relative to the longitudinal axis defined by the key blade, wherein the coaxial engagement site is shaped, sized and configured to engage the proximal end of the shaped head of the nested rod.

* * * * *